US008818396B2

(12) United States Patent
Fok et al.

(10) Patent No.: US 8,818,396 B2
(45) Date of Patent: Aug. 26, 2014

(54) APPARATUS AND METHODS FOR ASSOCIATING A LOCATION FIX HAVING A QUALITY OF SERVICE WITH AN EVENT OCCURING ON A WIRELESS DEVICE

(75) Inventors: Kenny Fok, San Diego, CA (US); Eric Chi Chung Yip, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 1189 days.

(21) Appl. No.: 12/171,464

(22) Filed: Jul. 11, 2008

(65) Prior Publication Data

US 2010/0009696 A1 Jan. 14, 2010

(51) Int. Cl.
*H04W 24/00* (2009.01)
*G08B 1/08* (2006.01)
*G08G 1/123* (2006.01)

(52) U.S. Cl.
USPC ............... 455/456.1; 340/539.13; 340/989; 340/990; 340/991; 340/992; 455/456.2; 455/456.3; 455/456.4; 455/456.5; 455/456.6

(58) Field of Classification Search
USPC .................. 455/456.1–456.6; 340/539.13; 340/989–994; 701/1–302
See application file for complete search history.

(56) References Cited

U.S. PATENT DOCUMENTS

| 6,445,927 | B1 | 9/2002 | King et al. |
| 6,903,684 | B1 | 6/2005 | Simic et al. |
| 2004/0152362 | A1* | 8/2004 | Carter et al. ................ 439/660 |
| 2004/0203717 | A1* | 10/2004 | Wingrowicz et al. ........ 455/423 |
| 2006/0246918 | A1* | 11/2006 | Fok et al. .................. 455/456.1 |
| 2007/0155401 | A1* | 7/2007 | Ward et al. ................ 455/456.1 |
| 2007/0161380 | A1 | 7/2007 | Fok et al. |
| 2008/0254808 | A1* | 10/2008 | Rekimoto ................ 455/456.1 |

FOREIGN PATENT DOCUMENTS

| EP | 1443791 A1 | 8/2004 |
| JP | 2004061464 A | 2/2004 |
| JP | 2008541013 A | 11/2008 |
| JP | 2009524010 A | 6/2009 |
| JP | 2011517669 A | 6/2011 |
| TW | I287106 B | 9/2007 |
| WO | WO2005103754 | 11/2005 |
| WO | WO2006116618 A1 | 11/2006 |
| WO | 2007082214 A2 | 7/2007 |
| WO | 2010006305 A1 | 1/2010 |

OTHER PUBLICATIONS

International Search Report and Written Opinion—PCT/US2009/050310, International Search Authority—European Patent Office—Nov. 24, 2009.
Taiwan Search Report—TW098123469—TIPO—Jul. 5, 2012.

* cited by examiner

*Primary Examiner* — Kent Chang
*Assistant Examiner* — Chayce Bibbee
(74) *Attorney, Agent, or Firm* — Abdollah Katbab

(57) ABSTRACT

Apparatus and methods for estimating a geographical position corresponding to an event associated with operation of a wireless device communicating in a wireless communications network. The time and distance between the occurrence of the event and the related time and speed of the wireless device of at least one of a first and second location fix, respectively measured before and after the event, are analyzed. The first and second location fixes having Quality of Service (QoS) adjusted such that the resulting fixes are based at least partly on terrestrial wireless communication measurements. These analyses include comparing those metrics to predetermined time thresholds to validate a geographic position and, in some instances, determine a preferred geographic position to associate with the event.

62 Claims, 22 Drawing Sheets

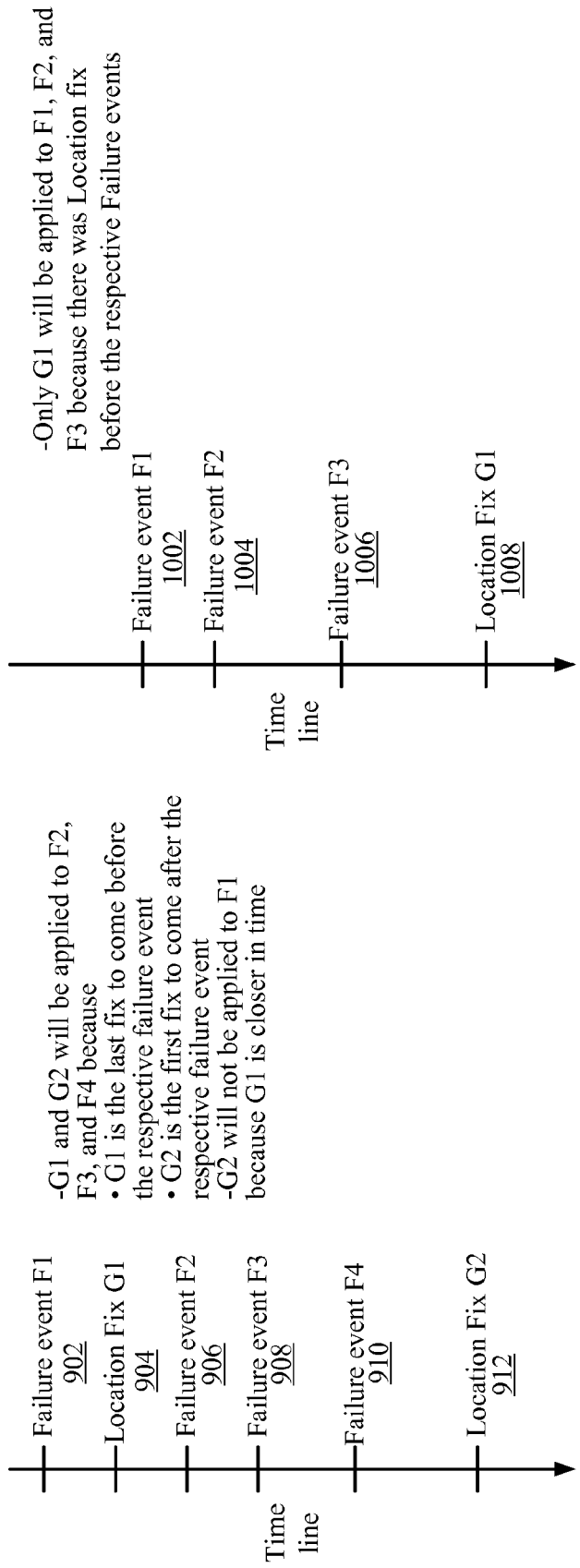

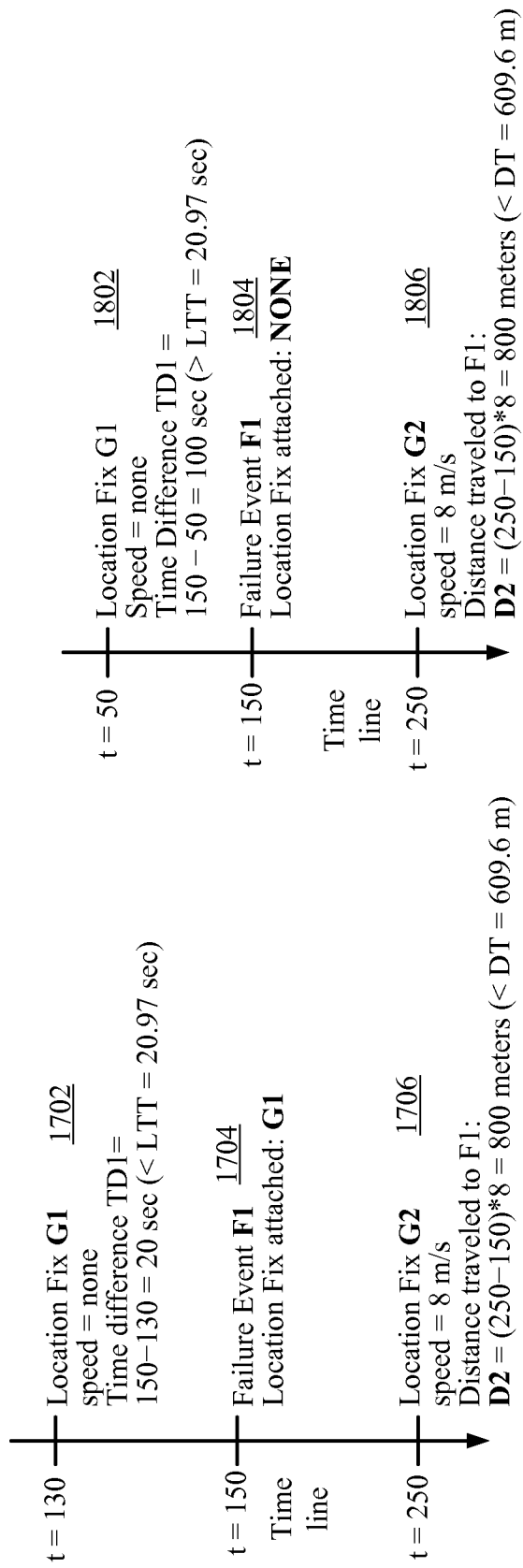

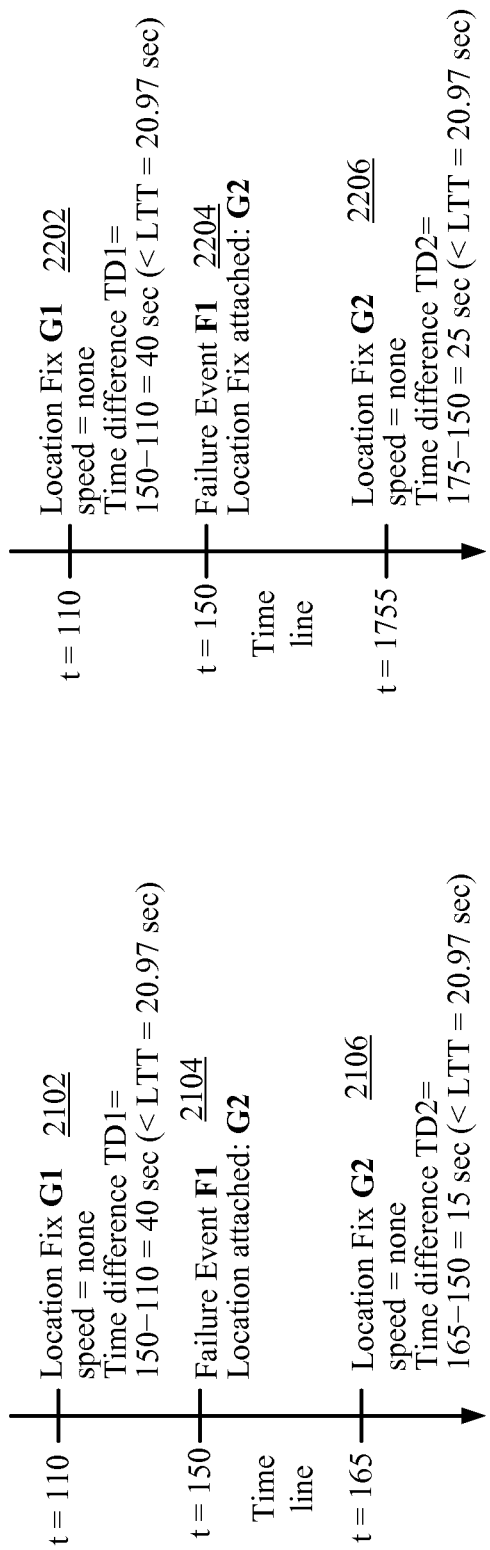

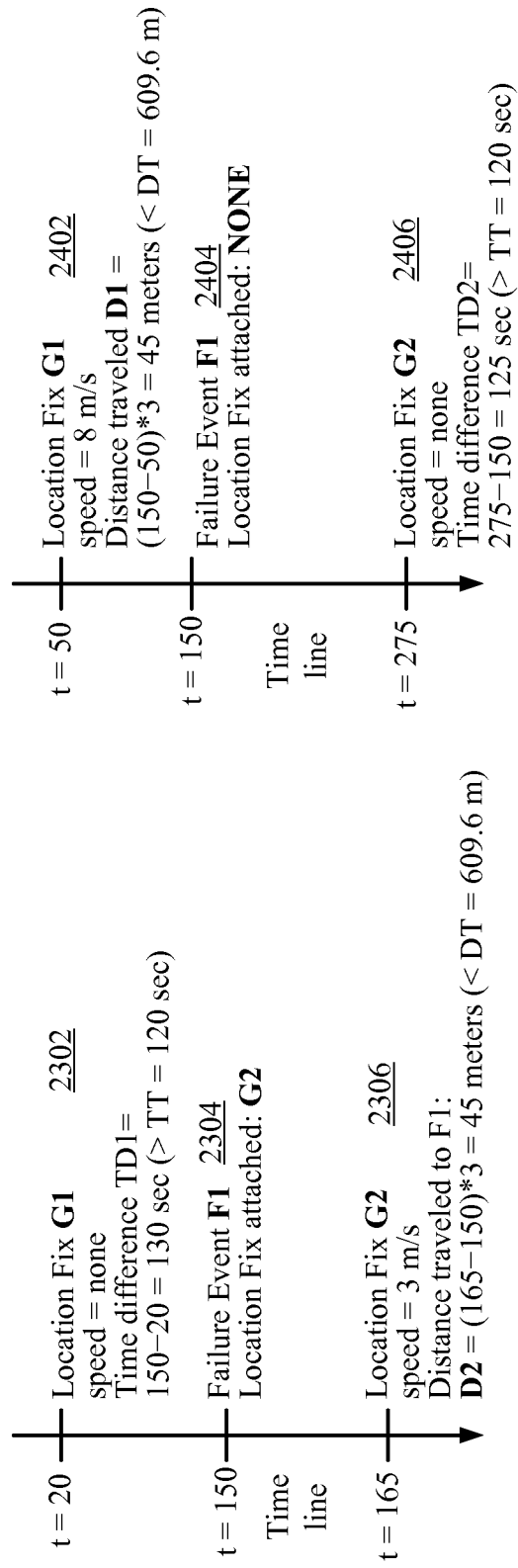

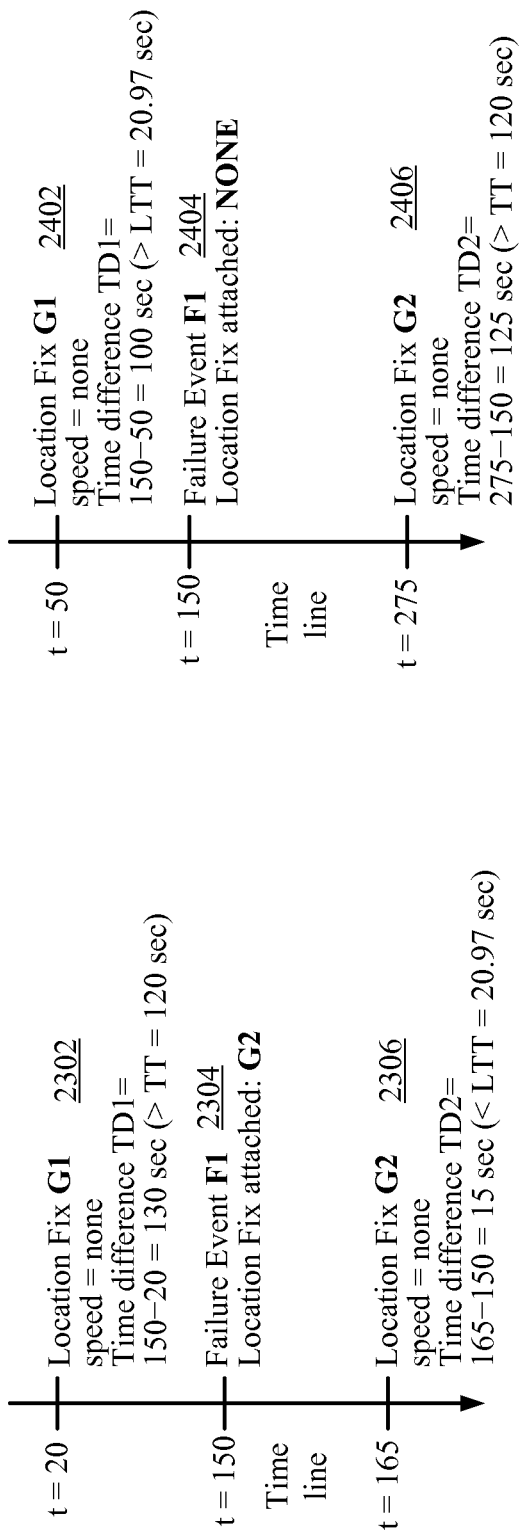

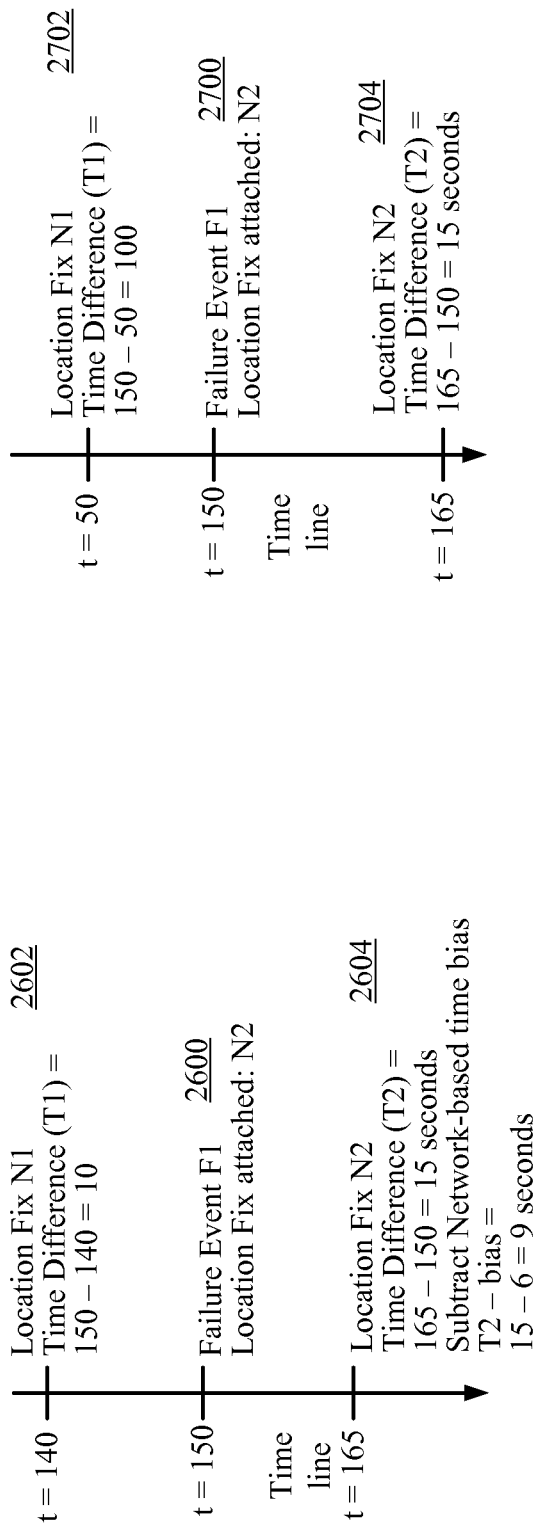

APPARATUS AND METHODS FOR ASSOCIATING A LOCATION FIX HAVING A QUALITY OF SERVICE WITH AN EVENT OCCURING ON A WIRELESS DEVICE

BACKGROUND

1. Field

The disclosed aspects relate to wireless devices and wireless communication networks, and more particularly, to apparatus and methods for determining an estimated geographical position of a wireless device corresponding to events associated with wireless devices on a wireless network, in particular determining an estimated geographical position from based on one or more location fixes having Quality of Service (QoS) adjusted so as to provide for fixes that are based at least partly on terrestrial wireless communication measurements.

2. Background

Many wireless communications devices, such as mobile phones, pagers, handheld computers, etc., have the ability to determine the location parameters associated with the geographical position of a wireless device on the surface of the earth. The location parameters may include the position and speed coordinates for the wireless device. The wireless device may include a geographical position location system in the form of hardware, software and/or firmware and other associated parameters. One exemplary wireless device geographical position location system receives and analyzes location parameters derived from the Global Positioning System (GPS), a radio-navigation system, developed and operated by the U.S. Defense Department, that includes a series of 24 constellation satellites orbiting the earth at a distance of approximately 20,000 kilometers. The GPS position location parameters permit wireless device processors to determine their respective three dimensional positions and velocities using very precise location parameters and timing signals received from the satellites.

Currently various modes of operation exist for determining location using satellites. For example, GPS, Galileo, GLONASS (GLObal NAvigation Satellite System) or other satellite-based systems may rely on a Mobile Station-Based (MS-Based) mode, a Mobile Station-Assisted (MS-Assisted) mode, a Standalone mode or any other feasible mode currently known or known in the future. The various modes offer different methods for determining location. For example, in MS-Based mode the wireless device obtains information related to the location of satellites from a network Location Determining Entity (PDE) and then performs the location determination calculation at the wireless communication device. The satellite location information is commonly referred to as Ephemeris data and Almanac data. Almanac data is course orbital parameters for all the satellites in the system and is considered valid for up to several months. Ephemeris data by comparison is very precise orbital and clock correction for each satellite and is considered valid for about 30 minutes. Thus, in MS-Based mode a wireless device may, but is not always required to, obtain the information from the PDE depending on the currentness of the satellite information.

In MS-Assisted mode the wireless device relies on the PDE to perform the location determination and, as such, is required to communicate with the PDE each time a location determination is performed. Therefore, by comparison, while MS-Based mode requires a wireless signal to communicate with the PDE for some of the location determinations, MS-Assisted mode requires a wireless signal to communicate with the PDE for all of the location determinations.

In contrast, in Standalone mode all the functions are carried out at the wireless device and, since no PDE satellite information is required, no wireless signal is required. However, Standalone mode requires that the wireless device receive signals from all four of the GPS satellites, while MS-Assisted mode only requires communication with one or two of the satellites to determine position. Thus, Standalone mode has a high failure rate when attempts are made indoors, while the MS-Assisted mode is typically the mode of preference when attempts are made indoors.

In current practice, the applicable location determination mode is defined by the application or is chosen at the initialization/start-up stage. Thus, the chosen mode applies to location determinations requests even if the mode may not be the best mode for all scenarios. Various conditions may exist throughout the executing duration of an application that are relevant to the effectiveness of the chosen mode. For example, MS-Assisted mode requires a wireless signal, such as a CDMA (Code Division Multiple Access) signal or GSM (Global System for Mobile) signal and, therefore, if the chosen mode is MS-Assisted, location determination will not occur if the wireless signal is not active. Other conditions that affect the performance of location determination modes are the current environment of the device, battery life, voice call state, data call state, the currentness of the PDE satellite information and the like.

In addition to relying on satellites to determine location, certain modes, such as MS-Assisted mode or the like, may take base station measurements to provide a terrestrial-based location determination. Terrestrial measurements and associated terrestrial-based location determination refers to any terrestrial-based measurements and terrestrial-based location determination that does not involve the use of satellite signals and measurements. Examples of terrestrial-based methods used to determine wireless device location include, but are not limited to, Advanced Forward Link Trilateration (AFLT), Enhanced Forward Link Trilateration (EFLT), Enhanced Observed Time Difference (EOTD), and the like. AFLT is the method generally associated with MS-Assisted mode and is a wireless device-based location determination method that uses a time difference of arrival technique to determine location. To determine location, the wireless device takes measurements of signals from nearby cellular base stations and reports the time/distance readings back to the network, which are then used to triangulate an approximate location of the wireless device. In general, at least three surrounding base stations are needed to obtain an optimal AFLT location fix. However, terrestrial-based methods tend to be less accurate than satellite-based location fixes.

As previously noted, satellite-based location determination methods generally require information from at least three satellites. Thus, the wireless device must be located in an area capable of receiving information from multiple satellites. Indoor locations, dense urban areas, and certain natural structures, like canyons and the like, may pose resistance to accurate and time efficient satellite fixes. In addition, other limitations such as erratic ionospheric conditions, noise at the wireless device level and the like may prohibit obtaining a satellite-based fix or impact the accuracy of the satellite-based fix. In these instances, it may be desirable to rely on terrestrial-based measurements to provide a less accurate, lower quality location determination.

In the same regard, certain wireless device applications that require location information may be more concerned with the speed in which a location determination fix occurs as opposed to the accuracy of the location fix. For example, in the mobile environment, applications that track the occurrence of a call event, such as a call drop, a call failure or the like, may be more concerned with determining the location at the moment the call event occurs as opposed to determining a more accurate location at a point in time removed from the call event. This is especially evident in the scenario in which the call event occurs in a moving vehicle; the call event tracking application desires an immediate location determination fix, regardless of accuracy, to be able to associate location with the call event. If the call event tracking application has to wait a certain amount of time for the location determination fix, the resulting location may be a significant distance from the location at which the call event occurred, depending on the speed of the vehicle. In this instance, the application may place a higher priority on speed at which a location is determined as opposed to the precise accuracy of the determined location.

Unfortunately, there are other problems associated with the use of GPS and other position location information by the wireless device that have not been addressed. Each time a wireless device requests and retrieves position location information, the request and retrieval processing consumes a relatively large amount of wireless device power. Further, if the wireless device does not support simultaneous voice and data calls, then the device will not be able to get a location fix during a voice call, or make a voice call during retrieval of a location fix. Also, the period of time from when the wireless device makes a requests for position fix information to when the wireless device receives the position fix information may be significant, depending on such factors as the relative position of the wireless device to the location of the satellite, the speed at which the wireless device is traveling, the performance of the position location processing system of the wireless device, the type of location determination system employed (for example, GPS, Assisted GPS, or other location determination system), and the performance characteristics of the wireless device antenna. Such parameters may exacerbate the ability of the wireless device to accurately determine the geographical position of the wireless device without draining wireless device power sources. The foregoing is particularly troubling when it is important to determine the position of the wireless device upon the occurrence of wireless device operational events, such as a call drop event on a cellular telephone.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

To address one or more of the drawbacks of the prior art, the disclosed aspects provide systems and methods for determining if a given location fix having a downward adjusted Quality of Service (QoS) is valid to associate with an event occurring on the wireless device and, if more than one location fix having a downward adjusted QoS is determined to be valid, the preferred location fix to associate with the event. Downward adjustment to the QoS for a vine location determination mode, such as MS-Assisted or the like, results in less search time allotted to acquire location measurements. As such, the fix that is returned based on the downward adjustment of the QoS is at least partly based on terrestrial wireless communication measurements, such as measurements taken at the base station or the like. In certain aspects, downward adjustment of the QoS will result in a location fix that does not include measurements based on satellites.

According to one aspect, a method is defined for estimating a geographical position corresponding to a wireless device event, such as a predetermined operation of the wireless device, a predetermined configurable sequences of data associated with the operation of the device or the like. The method includes receiving at least one of a first geographical position data of the wireless device corresponding to a first location fix having a first Quality of Service (QoS) and a second geographical position data of the wireless device corresponding to a second location fix having a second QoS. The first and second QoS result in fixes based at least partly on terrestrial wireless communication measurements. The method also includes determining an estimated geographical position of the wireless device based on a predetermined relationship between the event and at least one of the first geographical position data and the second geographical position data. In one optional aspect, the method may also include initiating the method based upon an event tracking configuration, for example, transmitting an event-tracking configuration to a wireless device across a wireless network. The event tracking configuration controls the retrieval of at least one of the first geographical position data and the second geographical position data from a processing subsystem of the wireless device.

In one optional aspect of the method the predetermined relationship results in application of an estimated geographical position algorithm specific to both first and second fixes being based at least partly on terrestrial wireless communication measurements. Further, in certain aspects at least one of the first geographical position data and the second geographical position data correspond to a Mobile-Station-Assisted (MS-Assisted) mode of location determination, for example, an Advanced Forward Link Trilateration (AFLT) location fix and, in more specific aspects, the AFLT location fix results from a Mobile Station-Assisted (MS-Assisted) location determination mode.

In one specific optional aspect of the method, the first geographical position data of the wireless device corresponds to a first fixed geographical position of the wireless device before a time corresponding to the event and the second geographical position data of the wireless device corresponds to a second fixed geographical position of the wireless device after the time corresponding to the event.

In a further optional aspect of the method, determining an estimated geographical position of the wireless device based on a predetermined relationship comprises selecting the estimated geographical position of the wireless device from one of the first geographical position data of the wireless device and the second geographical position data of the wireless device. In such aspects, the predetermined relationship may further include one or more time relationships comprising a time difference between (a) a time corresponding to the event and (b) a time corresponding to any one of the first geographical position data and the second geographical position data. In such aspects, the method may further include comparing the one or more time relationships to one or more corresponding predetermined time thresholds. The one or more time thresholds may include a predetermined time threshold and a low time threshold. The predetermined time threshold may be defined as a predetermined maximum time difference between (a) a time corresponding to either one of the first geographical position data of the wireless device and the second geographical position data of the wireless device, and (b) a time corresponding to the event. The low time threshold may be calculated or predefined and may be defined as a time taken by the wireless device to travel a predetermined distance threshold at a predetermined maximum speed.

Further optional aspects of the method may include selecting the first geographic position data as a basis for the estimated geographic position if, the first geographical position data corresponds to a first fixed geographical position of the wireless device before a time corresponding to the event and the first time difference between (a) a time corresponding to the first geographical position data, and (b) a time corresponding to the event is within the low time threshold; and the second geographical position data corresponds to a second fixed geographic position of the wireless device after the time corresponding to the event and the second time difference between (a) the time corresponding to the first geographical position data, and (b) a time corresponding to the event is outside of the time threshold.

Yet another further optional aspect of the method may include selecting the second geographic position data as a basis for the estimated geographic position if, the first geographical position data corresponds to a first fixed geographical position of the wireless device before a time corresponding to the event and the first time difference between (a) a time corresponding to the first geographical position data, and (b) a time corresponding to the event is outside of the low time threshold; and the second geographical position data corresponds to a second fixed geographic position of the wireless device after the time corresponding to the event and the second time difference between (a) the time corresponding to the first geographical position data, and (b) a time corresponding to the event is within the time threshold.

Yet another further optional aspect of the method may include selecting one of the first geographical position data and the second geographical position data as a basis for the estimated geographical position if the first geographical position data corresponds to a first fixed geographical position of the wireless device before a time corresponding to the event and the first time difference between (a) a time corresponding to the first geographical position data and (b) a time corresponding to the event is within the low time threshold; and the second geographical position data corresponds to a second fixed geographic position of the wireless device after the time corresponding to the event and the second time difference between (a) a time corresponding to the first geographical position data, and (b) a time corresponding to the event is within the time threshold. In such an aspect, the method may further include determining a preferred geographical position data from among the first and second geographical position data based on a comparison of the first time difference to the second time difference less a time bias. The time bias is defined as an average difference between (a) a time corresponding to geographical position data and (c) the time corresponding to a request for the geographical position data. Thus, a further aspect of the method may include selecting the first geographical position data as a basis for the estimated geographic position if the first time difference is less than the second time difference less the time bias or selecting the second geographic position data as a basis for the estimated geographic position if the first time difference is greater than or equal to the second time difference less the time bias.

A further aspect of the innovation is defined by at least one processor configured to estimate a geographical position corresponding to a wireless device event. The processor includes a first module for receiving at least one of a first geographical position data of the wireless device corresponding to a first location fix having a first Quality of Service (QoS) and a second geographical position data of the wireless device corresponding to a second location fix having a second QoS. The first and second QoS result in fixes based at least partly on terrestrial wireless communication measurements. The processor additionally includes a second module for determining an estimated geographical position of the wireless device based on a predetermined relationship between the event and at least one of the first geographical position data and the second geographical position data.

Yet another related aspect is provided for by a computer program product that includes a computer-readable medium. The medium includes a first set of codes for causing a computer to receive at least one of a first geographical position data of the wireless device corresponding to a first location fix having a first Quality of Service (QoS) and a second geographical position data of the wireless device corresponding to a second location fix having a second QoS. The first and second QoS result in fixes based at least partly on terrestrial wireless communication measurements. The medium additionally includes a second set of codes for causing a computer to determine an estimated geographical position of the wireless device based on a predetermined relationship between the event and at least one of the first geographical position data and the second geographical position data.

An apparatus defines yet another aspect of the innovation. The apparatus includes means for receiving at least one of a first geographical position data of the wireless device corresponding to a first location fix having a first Quality of Service (QoS) location fix and a second geographical position data of the wireless device corresponding to a second location fix having a second QoS. The first and second QoS result in fixes based at least partly on terrestrial wireless communication measurements. The apparatus also includes means for determining an estimated geographical position of the wireless device based on a predetermined relationship between the event and at least one of the first geographical position data and the second geographical position data.

Another aspect of the innovation is defined by an apparatus for estimating a geographical position corresponding to a wireless device event, such as predetermined operation of the wireless device, one or more predetermined configurable sequences of data associated with an operation of the wireless device or the like. The apparatus includes an event position determination module operable to receive at least one of a first set of location fix information of the wireless device corresponding to a first location fix having a first Quality of Service (QoS) and a second set of location fix information of the wireless device corresponding to a second location fix having a second QoS. The first and second QoS result in fixes based at least partly on terrestrial wireless communication measurements. The apparatus also includes an event position determination logic included in the module and operable to determine an estimated geographical position of the wireless device to associate with the event based on a predetermined relationship between the event and at least one of the first set of location fix information and the second set of location fix information. In one optional aspect, at least one of the first set of location fix information and the second set of location information are generated based on a detection of a predetermined event on the wireless device. As such, the event position determination module may be optionally operable to transmit an event-tracking configuration across a wireless network to the wireless device. The event-tracking configuration is executable by the wireless device to generate at least one of the first set of location fix information and the second set of location information.

In one optional aspect of the apparatus the predetermined relationship results in application of an estimated geographical position algorithm specific to both first and second fixes being based at least partly on terrestrial wireless communication measurements. Further, in certain aspects at least one of the first geographical position data and the second geographical position data correspond to a Mobile-Station-Assisted (MS-Assisted) mode of location determination, for example, an Advanced Forward Link Trilateration (AFLT) location fix and, in more specific aspects, the AFLT location fix results from a Mobile Station-Assisted (MS-Assisted) location determination mode.

In one optional aspect of the apparatus, the first location fix information corresponds to a first location fix time prior to an event time and the second location fix information corresponds to a second location fix time after the event time.

In a further optional aspect, the event position determination logic is further operable to determine the estimated geographical position based upon selecting one of the first location fix information and the second location fix information. In such aspects, the predetermined relationship comprises one or more time relationships comprising a time difference between (a) an event time corresponding to the event and (b) a time corresponding to either one of the first location fix information and the second location fix information. In such aspects, the event position determination logic may be further operable to compare the one or more time relationships to one or more corresponding predetermined time thresholds. The one or more predetermined time thresholds may include a predetermined time threshold and a low time threshold. The predetermined time threshold may be defined as a predetermined maximum time difference between (a) a time corresponding to either one of the first location fix information and the second location fix information, and (b) the event time. The low time threshold may be defined as a time taken by the wireless device to travel the predetermined distance threshold at a predetermined maximum speed.

In one aspect of the apparatus, the event position determination logic is operable to select the first location fix information as a basis for the estimated geographic position if, the first location fix information corresponds to a first fixed geographical position of the wireless device before a time corresponding to the event and a first time difference between (a) a time corresponding to the first location fix information and (b) a time corresponding to the event is within the low time threshold, and; the second location fix information corresponds to a second fixed geographic position of the wireless device after the time corresponding to the event and a second time difference between (a) the time corresponding to the first location fix information, and (b) a time corresponding to the event is outside of the time threshold.

In another optional aspect of the apparatus, the event position determination logic is operable to select the second location fix information as a basis for the estimated geographic position if, the first location fix information corresponds to a first fixed geographical position of the wireless device before a time corresponding to the event and a first time difference between (a) a time corresponding to the first location fix information and (b) a time corresponding to the event is outside of the low time threshold; and the second location fix information corresponds to a second fixed geographic position of the wireless device after the time corresponding to the event and a second time difference between (a) the time corresponding to the first location fix information, and (b) a time corresponding to the event is within the time threshold.

In yet a further optional aspect of the apparatus, the event position logic is operable to select one of the first location fix information and the second location fix information as the estimated geographical position if, the first location fix information corresponds to a first fixed geographical position of the wireless device before a time corresponding to the event and a first time difference between (a) a time corresponding to the first location fix information and (b) a time corresponding to the event is within the low time threshold; and the second location fix information corresponds to a second fixed geographic position of the wireless device after the time corresponding to the event and a second time difference between (a) the time corresponding to the first location fix information, and (b) a time corresponding to the event is within the time threshold. In such aspects, the event position logic may be further operable to determining a preferred location fix information from among the first and second location fix information based on a comparison of the first time difference to the second time difference less a time bias, where the time bias is defined as an average difference between (a) a time corresponding to location fix information and (c) the time corresponding to a request for the location fix information. Thus, the event position logic may be further operable to select the first location fix information as a basis for the estimated geographic position if the first time difference is less than the second time difference less the time bias or to select the second location fix information as a basis for the estimated geographic position if the first time difference is greater than or equal to than or equal to the second time difference less the time bias.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings provided to illustrate and not to limit the disclosed aspects, wherein like designations denote like elements, and in which:

FIGS. 12 and 13 are exemplary time line examples pertaining to an aspect of two GPS fixes and multiple events;

FIGS. 16-18 are exemplary time line examples pertaining to the aspect of the first case of FIG. 7;

FIGS. 19-22 are exemplary time line examples pertaining to the aspect of the second case of FIG. 8;

FIGS. 23-25 are exemplary time line examples pertaining to the aspect of the third case of FIG. 9;

FIGS. 26 and 27 are exemplary time line examples pertaining to the aspect of the fourth case of FIG. 10; and FIGS. 28 and 29 are exemplary time line examples pertaining to the aspect of the fifth case of FIG. 11.

FIG. 31-34 are exemplary time line examples pertaining to the aspects depicted in FIG. 30.

DETAILED DESCRIPTION

Figure 1:
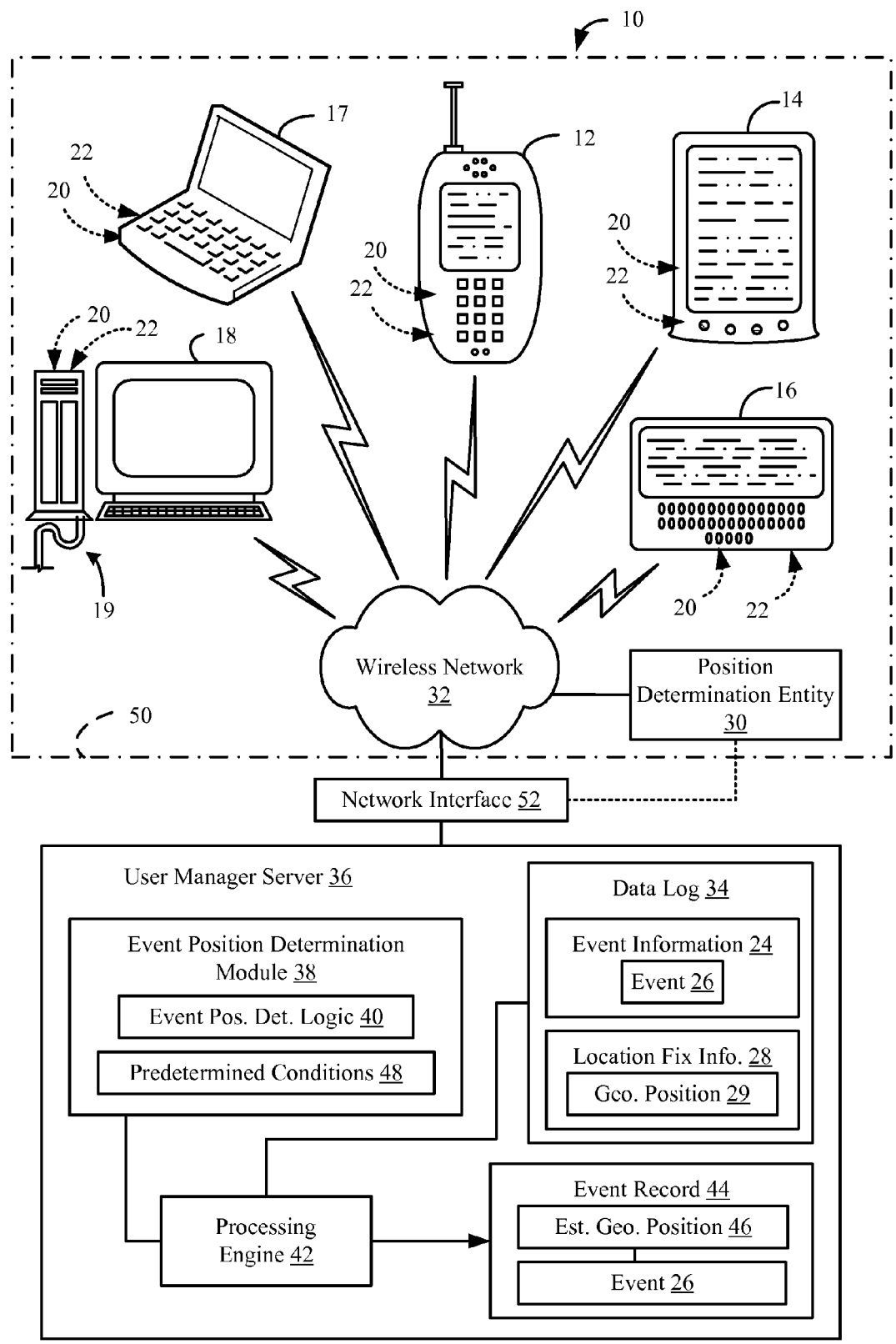
FIG. 1 is a representative diagram of one aspect of a position system associated with a wireless device and a wireless communication network.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM□, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The following discussion is an overview of the aspects of FIGS. 1-34. In general, these described aspects deal with apparatus and methods of determining a geographic position to associate with a detected event occurring on a wireless device. In these aspects, the wireless device detects an event based on a predetermined event-tracking configuration. Further, the wireless device includes logic that triggers the retrieval of post-event location fix information upon detection of the event. Additionally, the wireless device may have pre-event location fix information from prior to the occurrence of the detected event. A user manager/server across a wireless network retrieves all of this information from the wireless device, and includes an event position determination module to determine a geographic position to associate with the detected event based on this information. In particular, the event position determination module includes a number of predetermined conditions, based on a number of predetermined parameters, and applies these conditions in a predetermined manner to at least one of the pre- and post-event location fix information in order to make this determination. In one aspect, the event position determination module may attempt to determine location based on fixes that have adjusted Quality of Services For example, in one aspect, the QoS for a fix may be adjusted downward to provide for a faster return of the fix. In such instances, the search time is limited and the location determination mode implemented may be limited to returning a fix based at least partly on terrestrial wireless communication measurements, such as AFLT or the like.

Generally, in some aspects, in which the QoS is not adjusted or is adjusted upward to allow for additional search time, these predetermined conditions associate a given satellite-based location fix (e.g. a location fix that relies on determining positioning using satellites or the like), with an event if: (1) a time difference between a time associated with the location fix and the event time is within a predetermined time threshold; and (2) a distance traveled from the location fix, computed based on a wireless device velocity/speed and the time difference, is within a predetermined distance threshold; or (3) when a velocity/speed of the wireless device associated with the location fix is not known, and the time difference is within a low time threshold, which is computed as the time needed to travel the predetermined distance threshold at a predetermined maximum speed. Further, if deciding between both a pre- and post-event location fix that satisfy both the time threshold and the distance threshold (both (1) and (2) above), then the determination module associates the location fix having the smallest distance traveled with the event. Similarly, if deciding between both a pre- and post-event location fix that satisfy both the time threshold and the low time threshold (both (1) and (3) above), then the determination module associates the location fix having the smallest time difference with the event.

Additionally, in other aspects these predetermined conditions associate a given location fix having a QoS that results in a fix at least partly based on terrestrial wireless communication measurements with an event if: (1) a time difference between a time associated with the post-event location fix and the event time is within a predetermined time threshold; and (2) a time difference between a time associated with the pre-event location fix geographic position and the event time is within a low time threshold, which is computed as the time needed to travel the predetermined distance threshold at a predetermined maximum speed. Further, if deciding between both a pre- and post-event location fix that satisfy both the time threshold for the post-event position and the low time threshold for the pre-event position, then the determination module associates the "preferred" fix between the pre-event fix and the post-event fix. The "preferred" fix is the pre-event location fix if the time difference between the pre-event fix and the event is determined to be less than the time difference between the post-event fix and the event less the terrestrial-based fix time bias. In which, the location fix time bias is defined as the average difference between the time of an location fix and the time at which the location fix is requested.

Thus, these described aspects provide a relatively uncomplicated solution for determining whether or not to associate a given geographic position with an event occurring on a wireless device. The details of the apparatus and methods are described below.

Figure 2:
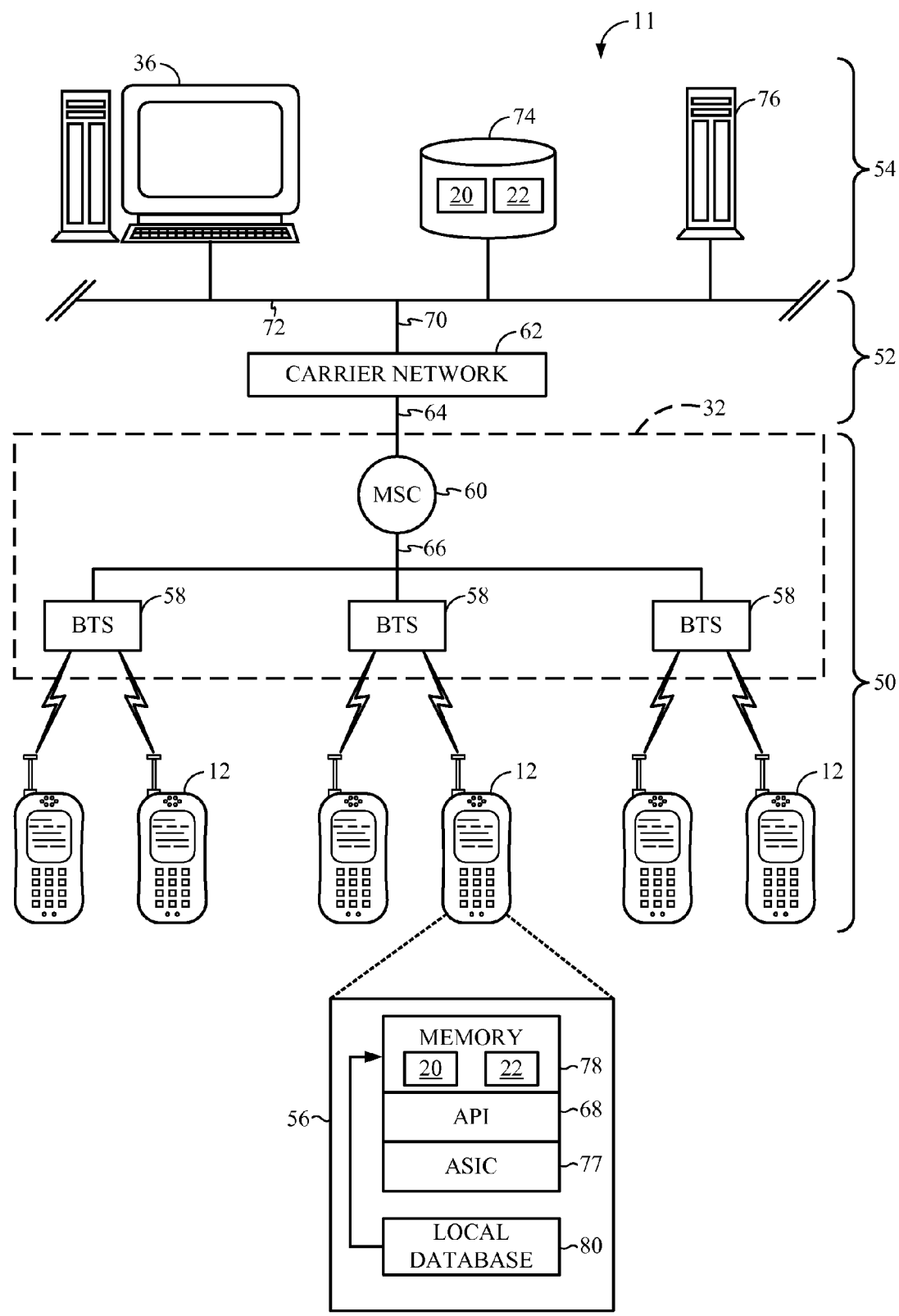
FIG. 2 is a schematic diagram of one aspect of a cellular telephone network aspect of the system of FIG. 1, including one aspect of a computer platform of the computer device of FIG. 1.
Figure 3:
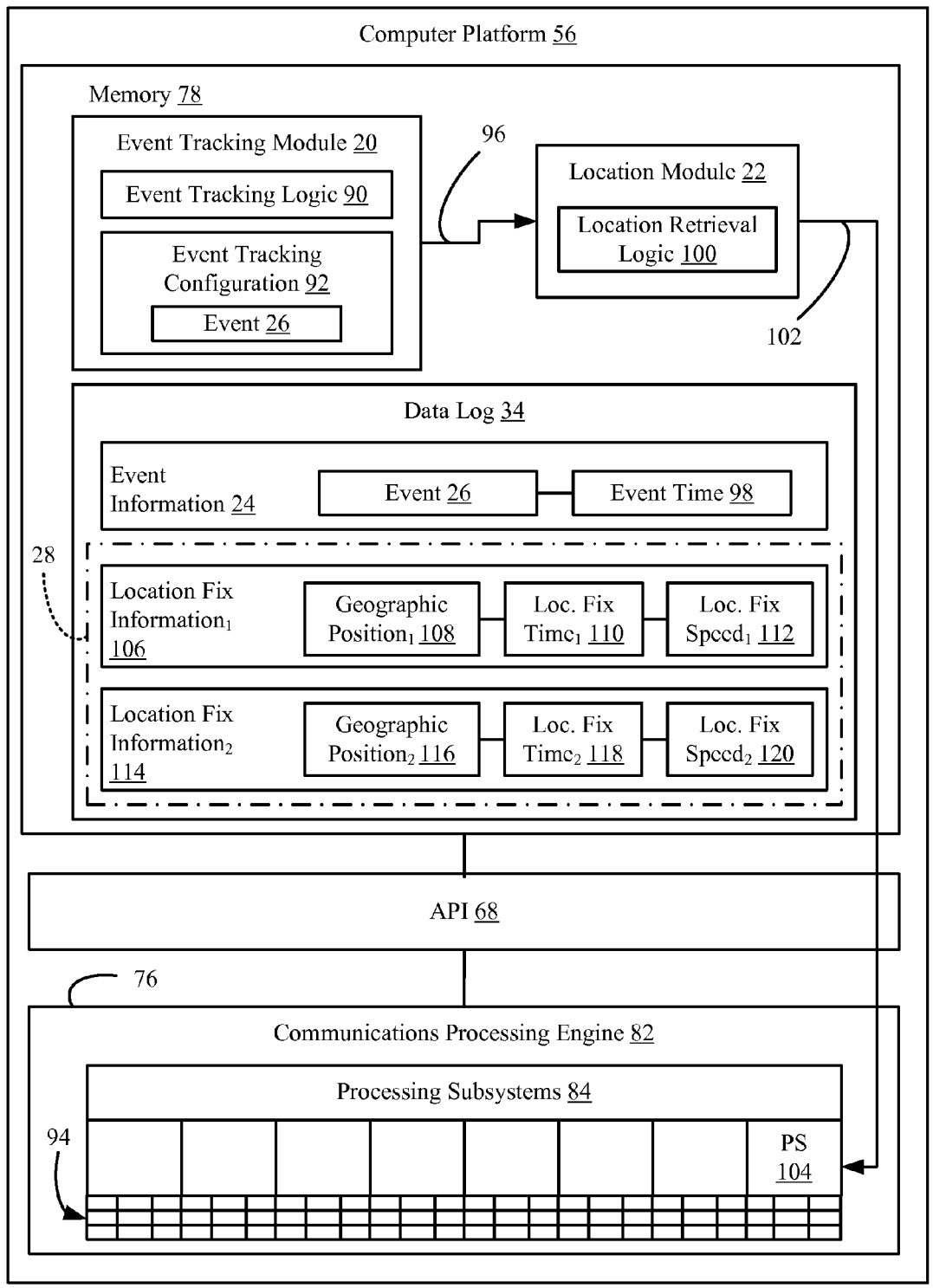
FIG. 3 is one aspect of an architecture diagram of the computer platform of FIG. 2.

Referring to FIGS. 1-3, one aspect of a system or apparatus 10 for associating a geographic position with an operational event on a wireless device includes a plurality of wireless devices 12, 14, 16, 17, 18 that each include an event tracking module 20 and a location module 22. Event tracking module 20 is operable to gather event information 24 associated with an event 26 occurring on the respective wireless device, and to cause location module 22 to retrieve location fix information 28, including a geographic position 29, upon detection of event 26. Location module 22 may retrieve location fix information 28 from a position determination entity 30 located across wireless network 32. Each respective wireless device 12, 14, 16, 17, 18 stores event information 24 and location fix information 28 in a data log 34, which is retrievable by a user manager server 36 located across wireless network 32. It should be noted that data log 34 may include at least one, or a plurality of location fix information 28, and hence at least one, or a plurality of geographic positions 29. The plurality of location fix information 28 may be caused by prior or subsequent events detected by event tracking module 20, by configured periodic retrievals of location fix information performed by location module 22, and/or by location fix information dictated by other modules or applications operating on the respective wireless device. Additionally, location fix information 28 may be associated with a location fix having a non-adjusted QoS or an upward adjusted QoS, which generally results in a satellite-based fix, or the location fix information 28 may be associated with a downward adjusted QoS, which generally results in a fix at least partly based on terrestrial wireless communication measurements. In any case, user manager 36 includes an event position determination module 38 having logic 40 executable by a processing engine 42 to generate an event record 44 that associates an estimated geographic position 46 with detected event 26 if one or more predetermined conditions 48 are satisfied, as will be discussed in more detail below.

In one aspect, wireless devices 12, 14, 16, 17, 18 are positioned within a wireless network area 50 and communicate across wireless network 32 with each other, and/or with a user manager server 36. User manager 36 may communicate with wireless devices 12, 14, 16, 17, 18 through a direct, wired connection or through a wireless connection, such as through a network interface 52 in communication with wireless network area 50. The communications between user manager 36 and wireless devices 12, 14, 16, 17, 18 may include, for example, downloads of all, or selected portions (such as particular test suites), of event tracking module 20 and uploads of data logs 34 back to user manager 36.

The following discussion employs FIGS. 1-29 to provide a detailed description of the disclosed aspects. Beginning with FIG. 1, system 10 illustrated in this figure is a representative diagram of the described aspects associated with wireless devices functioning in a wireless communication network. FIG. 1 has three main components, namely a first component wireless network area 50, a second component network interface 52, and a third component user manager 36.

Beginning with the first component, wireless network area 50 includes a plurality of wireless devices 12, 14, 16, 17, 18 wirelessly connected to a wireless network 32. The wireless network 32 provides a wireless communications connection across network interface 52 to a user manager server 36.

As illustrated in FIG. 1, the wireless devices can include any mobile or portable communications device, such as cellular telephone 12, personal digital assistant 14, two-way text pager 16, a laptop computer 17, a tablet computer, and even a separate computer platform 18 that has a wireless communication portal, and which also may have a wired connection 19 to a network or the Internet. Additionally, the wireless device can be a remote-slave, or other device that does not have an end-user thereof but simply communicates data across the wireless network 32. For example, the wireless device may include a remote sensor, a diagnostic tool, a data relay, and the like. The described aspects for estimating a geographical position corresponding to a wireless device event can be applied to any form of wireless communications device or module, including a wireless communication portal, a wireless modem, PCMCIA cards, access terminals, personal computers, telephones, or any combination or sub-combination thereof.

As further illustrated in FIG. 1, wireless network 32 includes any communications network operable, at least in part, for enabling wireless communications between a respective wireless device 12, 14, 16, 17, 18 and any other device connected to wireless network 32. Further wireless network 32 includes all network components, and all connected devices that form the network. Wireless network 32 may include at least one, or any combination, of: a cellular telephone network; a terrestrial telephone network; a satellite telephone network; an infrared network such as an Infrared Data Association (IrDA)-based network; a short-range wireless network; a Bluetooth® technology network; a home radio frequency (HomeRF) network; a shared wireless access protocol (SWAP) network; an ultra wide band (UWB) network; a ZigBee® protocol network; a wideband network, such as a wireless Ethernet compatibility alliance (WECA) network, a wireless fidelity alliance (Wi-Fi Alliance) network, and a 802.11 network; a public switched telephone network; a public heterogeneous communications network, such as the Internet; a private communications network; and land mobile radio network. Suitable examples of telephone networks include at least one, or any combination, of analog and digital networks/technologies, such as: Personal Communications Services, code division multiple access, wideband code division multiple access, universal mobile telecommunications system, advanced mobile phone service, time division multiple access, frequency division multiple access, global system for mobile communication, analog and digital satellite systems, and any other technologies/protocols that may be used in at least one of a wireless communications network and a data communications network.

Each of wireless devices 12, 14, 16, 17, 18 is illustrated to include a resident event tracking module 20 and location module 22. These modules may be located resident to the wireless devices 12, 14, 16, 17, 18, as shown, or alternatively may be remotely accessible from the wireless devices 12, 14, 16, 17, 18. Modules 20 and 22 include any combination of software, hardware, firmware and generally any executable instructions operable by one or more processors resident on or remote from wireless devices 12, 14, 16, 17, 18. The features and functions of resident event tracking module 20 and location module 22, including their components, are described further in the aspects below.

As noted, the second component of FIG. 1 is network interface 52. Network interface 52 may be any mechanism that allows user manager server 36 and/or position determination entity 30 to communicate with wireless network 32. For example, network interface 52 may include a local area network that connects user manager server 36 and/or position determination entity 30 through an Internet Service Provider to the Internet, which in turn may be connected to a respective wireless device through a carrier network and a base station.

The third component illustrated in FIG. 1 is user manager server 36. User manager server 36 may be any combination of processors, including hardware, firmware, software, and combinations thereof, and memory, including read-only memory ("ROM"), random-access memory ("RAM"), EPROM, EEPROM, flash memory cells, secondary or tertiary storage devices, such as magnetic media, optical media, tape, or soft or hard disk, comprising one or more platforms, such as servers, personal computers, mini-mainframes, mainframes, etc.

User manager server 36 includes data log 34, which is a data repository operable to store a collection of the plurality of location fix information 28 and also event information 24. This information is received by user manager server 36 from across wireless network 32 from each of the wireless devices 12, 14, 16, 17, 18 based on their given configuration. Data log 34 may be resident on user manager server 36, as shown, or remotely accessible from user manager 36. The features and functions associated with data log 34, including its components, are described further in the aspects below.

Processing engine 42 may be any combination of processors, including an application-specific integrated circuit ("ASIC"), a chipset, a processor, a microprocessor, a logic circuit, and any other data processing device, functioning in association with related memory, including read-only memory ("ROM"), random-access memory ("RAM"), EPROM, EEPROM, flash memory cells, secondary or tertiary storage devices, such as magnetic media, optical media, tape, or soft or hard disk, whether resident on user manager server 36 or remotely accessible from user manager server 36. Processing engine 42 performs one or more processing functions for user manager server 36. Accordingly, processing engine 42 may execute a module resident on or remotely assessable by user manager server 36 to perform a given function. The features and functions associated with processing engine 42, including its components, are described further in the aspects below.

Event position determination module 38, including its components event position determination logic 40 and predetermined conditions 48, include any combination of software, hardware, firmware and generally any executable instructions operable by one or more processors resident on or remote from user manager server 36. In one aspect, this module is executed by resident processing engine 42. Event position determination module 38 is executable by user manager server 36, specifically processing engine 42, to manage the collection of data logs 34 from wireless devices 12, 14, 16, 17, 18. Event position determination module 38 may "pull" the logs 34 based on commands from a user, or the logs may be "pushed" from the respective wireless devices 12, 14, 16, 17, 18 at predetermined times or upon reaching predetermined memory/data storage levels. Specifically, processing engine 42 may execute event position determination module 38 to parse and process data log 34 to generate event record 44. In another aspect, a resident version of event position determination module 38 may be downloaded by user manager server 36 to each wireless device 12, 14, 16, 17, 18 so that each respective device may locally generate event record 44. Additionally, the resident version of event position determination module 38 may also be loaded onto the respective wireless device during the initial assembly process, or via serial connections during a configuration process.

In one or more aspects, user manager server 36 (or plurality of servers) sends software agents, or applications, including event tracking module 20 and/or location module 22, to wireless devices 12, 14, 16, 17, 18 such that the wireless devices return data from their resident applications and subsystems. Further, there can be separate servers or computer devices associated with user manager server 36 that work in concert to provide data in usable formats, and/or a separate layer of control in the data flow between the wireless devices 12, 14, 16, 17, 18 and user manager server 36.

Event record 44 may be presented in any format, such as in a table, in a graphic, in an audio file, etc., that enables a user of system 10 to utilize the associated event 26 and estimated geographic position 46.

In the disclosed aspects, access to, processing of, and updating of any of the components of user manager server 36, whether the components are resident on user manager server 36 or remotely accessible by user manager server 36, may be performed by a user, through a user interface, or any combination of software, hardware, firmware and generally any executable instructions operable by one or more processors, through either a direct or remote connection, from any of a wireless device 12, 14, 16, 17, 18, user manager server 36, or any other network component. As one example, through the input of commands by a user through a standard HTTP, an FTP or some other data transfer protocol interfaced with the respective wireless device, processing engine 42 is invoked to execute event position determination module 38 to provide access to and processing of data log 34 to generate event record 44.

FIG. 2 is a more detailed schematic diagram of a cellular telephone aspect of FIG. 1. The cellular wireless network 11 and plurality of cellular telephones 12 of FIG. 2 are merely exemplary, and the disclosed aspects can include any system whereby any remote modules, such as wireless devices 12, 14, 16, 17, 18, communicate over-the-air between and among each other and/or between and among components of a wireless network, including, without limitation, wireless network carriers and/or servers. FIG. 2 illustrates three main components, namely the wireless network area 50 of FIG. 1, the network interface 52 of FIG. 1, and a server environment 54. In addition, a local computer platform 56 pertaining to exemplary cellular telephones 12 is illustrated, whose features and functions, including its components, are described further in the aspects below.

Wireless network area 50 is illustrated to include a plurality of cellular telephones 12. In addition, wireless network area 50 includes wireless network 32, as previously described with respect to FIG. 1. Here, wireless network 32 includes multiple base stations ("BTS") 58 and a mobile switching center ("MSC") 60.

MSC 60 may be connected to network interface 52, specifically its component carrier network 62, through either a wired or wireline connection network 64. For example, network 64 may comprise a data services network, a switched voice services network, often referred to as POTS ("plain old telephone service"), and/or a combination of both, including for example an Internet portion of a network for data information transfer and a POTS portion of a network for voice information transfer. For example, typically, in network 64, network or Internet portions transfers data, and the POTS portion transfers voice information transfer.

MSC 60 may also be connected to the multiple BTS's 58 by another network 66. Network 66 may carry data and/or switched voice information. For example, network 66 may comprise a data network, a voice network, and/or a combination of both, including for example an Internet portion of a network for data transfer and a POTS portion of a network for voice information transfer.

BTSs 58 are wirelessly connected to exemplary cellular telephones 12 in wireless network area 50. For example, BTS 58 may ultimately broadcast messages wirelessly to cellular telephones 12 or receive messages wirelessly from cellular telephones 12, via POTS switched voice service, data transfer services (including short messaging service ("SMS")), or other over-the-air methods.

The use of cellular telecommunication pathways has increased because wireless devices, such as the shown cellular telephones 12, are being manufactured with increased computing capabilities and are becoming tantamount to personal computers and hand-held personal digital assistants ("PDAs"), communicating packets including voice and data over wireless network 32. These "smart" cellular telephones 12 have installed application programming interfaces ("APIs") 68 onto their local computer platform 56 that allow software developers to create software applications that operate on the cellular telephone, and control certain functionality on the device. The features and functions associated with cellular telephones 12, as exemplary of wireless devices 12, 14, 16, 17, 18, including its components, are described further in the aspects below.

As noted, the second component of FIG. 2 is network interface 52. Although described with respect to FIG. 1, network interface 52 is illustrated in greater detail for the aspects of this FIG. 2. Specifically, network interface 52 is shown to include carrier network 62, data link 70 and local area network ("LAN") 72.

The features and functions associated with data link 70 and LAN 72 are described below with reference to server environment 54.

Carrier network 62 is any regional, national or international network offering switched voice communication and/or data communication services. As such, carrier network 64 may include switched voice or data service provider communications facilities and lines, including data and/or switched voice information, or any combination of both, including for example an Internet portion of a network for data transfer and a POTS portion of a network for voice information transfer. In one aspect, carrier network 62 controls messages, generally in the form of data packets, sent to or received from a mobile switching center ("MSC") 60.

The third main component of FIG. 2 is server environment 54. Server environment 54 is the environment wherein the above described user manager server 36 functions. As illustrated, server environment 54 may include the user manager server 36, a separate data repository 74, and data management server 76.

In system 11, user manager server 36 can be in communication over LAN network 72 (of network interface 52) with a separate data repository 74 for storing the data gathered from the remote wireless devices 12, 14, 16, 17, 18, such as the respective data logs 34. Further, data management server 76 may be in communication with user manager server 36 to provide post-processing capabilities, data flow control, etc. User manager server 36, data repository 74 and data management server 76 may be present on the illustrated network with any other network components that are needed to provide cellular telecommunication services. User manager server 36, and/or data management server 76 communicate with carrier network 62 through a data link 70 (of network interface 52) such as the Internet, a secure LAN, WAN, or other network.

Referring back to wireless network area 50, as noted each exemplary cellular telephones 12 may include a local computer platform 56. Each local computer platforms 56 is operable to permit a wireless device 12, 14, 16, 17, 18, such as cellular phones 12, to transmit data across wireless network 32, or receive data from wireless network 32, in addition to receiving and executing software applications, and displaying data transmitted from user manager server 36 or another computer device connected to wireless network 32. Computer platform 56 includes memory 78 (including resident event tracking module 20 and location module 22), application programming interface ("API") 68, application-specific integrated circuit ("ASIC") 77, and local database 80. Each of the aforementioned components may be resident on the wireless devices 12, 14, 16, 17, 18, or alternatively, may be remotely accessible by wireless devices 12, 14, 16, 17, 18. The features and functions associated with local computer platform 56 of wireless devices 12, 14, 16, 17, 18, including its components, are described further in the aspects below.

FIG. 3 is a more detailed view of local computer platform 56 of any wireless device, such as exemplary cellular telephones 12, shown with reference to FIG. 2 above. The illustrated local computer platform 56 is merely exemplary and can include any system for implementing the functions of the present aspects. As noted with reference to FIG. 2, and as illustrated in FIG. 3, computer platform 56 includes memory 78, application programming interface ("API") 68, and application-specific integrated circuit ("ASIC") 77. In the disclosed aspects, each of the aforementioned components may be resident on the wireless devices 12, 14, 16, 17, 18, or alternatively, may be remotely accessible by wireless devices 12, 14, 16, 17, 18.

Beginning with ASIC 77, this component may comprise an application-specific integrated circuit, or other chipset, processor, microprocessor, logic circuit, or other data processing device. ASIC 77 performs one or more processing functions for the respective wireless device. ASIC 77, or another processor, may execute API layer 68 that interfaces with a module resident on or remotely accessible from the wireless devices 12, 14, 16, 17, 18, to perform a given function. The foregoing is performed through API software extensions, as described below. As shown, ASIC 77 may execute, through API layer 68, event tracking module 20 and location module 22.

As shown in FIG. 3, in one or more described aspects ASIC 77 comprises, in whole or in part, communications processing engine 82. Communications processing engine 82 includes various processing subsystems 84, embodied in hardware, firmware, software, and combinations thereof, that enable the functionality of the respective wireless device 12, 14, 16, 17, 18 and the operability of the respective device on wireless network 32, such as for initiating and maintaining communications, and exchanging data, with other networked devices.

For example, in one aspect, communications processing engine 82 may include one or a combination of processing subsystems 84, such as: sound, non-volatile memory, file system, transmit, receive, searcher, layer 1, layer 2, layer 3, main control, remote procedure, handset, power management, diagnostic, digital signal processor, vocoder, messaging, call manager, Bluetooth® system, Bluetooth® LPOS, position determination, position engine, user interface, sleep, data services, security, authentication, USIM/SIM, voice services, graphics, USB, multimedia such as MPEG, GPRS, etc.

For the disclosed aspects, processing subsystems 84 of communications processing engine 82 may include any subsystem components that interact with applications executing on computer platform 56. For example, processing subsystems 84 may include any subsystem components, which receive data reads and data writes from API 68 on behalf of event tracking module 20 and location module 22.

API 68 is a runtime environment executing on the respective wireless device. An exemplary runtime environment is Binary Runtime Environment for Wireless® (BREW®) software developed by QUALCOMM, Inc., of San Diego, Calif. Other runtime environments may be utilized that, for example, operate to control the execution of applications on wireless computing devices. API 68 may include a class of software extensions that allow the resident version, or remotely accessible version, of a module to be processed by communications processing engine 82. These software class extensions can communicate with processing subsystems 84 on the wireless device, which allows both data reads and commands. For example, the software extension can send commands on behalf of the applications that invoke it. The module can then forward the responses of the subsystems ultimately across wireless network area 50 to user manager server 36. Each resident application or module on wireless device can create an instance of this new software extension to communicate with the subsystems independently.

Memory 78 may be any type of memory, including read-only memory ("ROM"), random-access memory ("RAM"), EPROM, EEPROM, flash memory cells, secondary or tertiary storage devices, such as magnetic media, optical media, tape, or soft or hard disk, whether resident on computer platform 56 or remotely accessible from computer platform 56. Computer platform 56 may also include a local database 80 (FIG. 2) that can hold the software applications, files, or data not actively used in memory 78, such as the software applications or data downloaded from user manager server 36. Local database 80 typically includes one or more flash memory cells, but can be any secondary or tertiary storage device, such as magnetic media, EPROM, EEPROM, optical media, tape, or soft or hard disk. Additionally, local database 80 can ultimately hold a local copy of event tracking module 20 and location module 22.

In one aspect, memory 78 includes event tracking module 20 having logic 90 executable by communications processing engine 82 through API 68 to identify a predetermined event 26 based on an event tracking configuration 92 that defines parameters for monitoring processing data 94 within processing subsystems 84. For instance, user manager 36 may be utilized to develop and transmit event-tracking configuration 92 to the respective wireless device. Event tracking configuration 92 may identify what processing data 94 to monitor, when to monitor the processing data, how to collect and store the data, and when to transmit the collected data to user manager 36. Additionally, processing data 94 within subsystems 84 may include predetermined events, predetermined data, and/or predetermined sequences or sets of data and/or events. Upon detection of event 26 as defined by event tracking configuration 92, event-tracking logic 90 causes event information 24 to be stored in data log 34. In one aspect, for example, event information 24 comprises event 26, such as a description, indicator and/or representation of the configured event, and event time 98, such as a timestamp corresponding to the time of occurrence of the event. Further, upon detection of event 26, event-tracking logic 90 triggers a position determination request 96 to be sent to location module 22.

Location module 22 has location retrieval logic 100 operable to allow location module 22 to receive position determination request 96 and subsequently generate a location fix request 102 through API 68 to a designated processing subsystem component, such as a position service component 104. Additionally, location retrieval logic 100 is executable to initiate storage of the resulting location fix information 28 in data log 34. Location fix information 28 may include a geographic position or location fix of the wireless device and a location fix time associated with the geographic position. Additionally, depending how the geographic position is determined, location fix information 28 may also include an associated location fix velocity or speed of the wireless device.

There may be a plurality of location fix information 28 stored in data log 34. As such, there may be a first set of location fix information 106 having a first geographic position 108, a first fix time 110 and a first fix speed 112, where first fix time 110 is a time prior to event time 98. Additionally, there may be a second set of location fix information 114 having a second geographic position 116, a second fix time 118 and a second fix speed 120 associated with location fix request 102 triggered by the occurrence of event 26, where second fix time 118 is a time after event time 98.

In one aspect, position service ("PS") component 104, when executed by communications processing engine 82, retrieves location fix information 28 from an external source, such as position determination entity 30 (FIG. 1). PS component 104 may perform its functions, for example, based on the aforementioned location fix request 102, upon powering up of the wireless device, upon initiating execution of a given application or module, upon predetermined time intervals, upon other specific requests from other applications or modules, and/or upon a synchronized time basis, etc. In the disclosed aspects PS component 104 is one example of a component used in coordination with, or in relation to, the components of location module 22.

Location module 22 may comprise, in whole or in part, a geographic information system ("GIS"), such as a tool used to gather, transform, manipulate, analyze, and produce information related to the surface of the earth. Such a GIS can be as complex as a whole system using dedicated databases and workstations hooked up to a network, or as simple as "off-the-shelf" desktop software. One example of such a system may include the QPoint™ Positioning Software and gpsOne® hybrid Assisted GPS wireless location technology, available from QUALCOMM, Inc. of San Diego, Calif.

In one aspect, such a GIS may include a global positioning system ("GPS"), such as a satellite navigational system formed by satellites orbiting the earth and their corresponding receivers on the earth. The GPS satellites continuously transmit digital radio signals that contain data on the satellites' location and the exact time to the earth-bound receiver. The satellites are equipped with atomic clocks that are precise, for example, to within a billionth of a second. Based on this information the receivers know how long it takes for the signal to reach the receiver on earth. As each signal travels at the speed of light, the longer it takes the receiver to get the signal, the farther away the satellite is located. By knowing how far away a satellite is, the receiver knows that it is located somewhere on the surface of an imaginary sphere centered at the satellite. By using three satellites, GPS can calculate the longitude and latitude of the receiver based on where the three spheres intersect. By using four satellites, GPS can also determine altitude. In addition to transmitting location parameters associated with the location of the wireless devices, the GPS satellites may also transmit speed parameters associated with the speed of the wireless devices.

In another aspect, such a GIS may include, in whole or part, a terrestrial-based or hybrid positioning system whereby location module 22, PS component 104, and/or some other remote position determination entity 30, determine the geographical position of the wireless devices based, at least in part, on network-based measurements. For instance, communication signals may be exchanged between the respective wireless device and network components of wireless network area 50. These communication signals include timing information that enables location module 22, PS component 104, and/or some other remote position determination entity 30 to compute a relative position, and hence a geographic position, of the wireless device with respect to a known position. For example, such communications signals may include the signals periodically exchanged between wireless devices 12, 14, 16, 17, 18 and BTS 58. Such a terrestrial-based system may also be utilized in combination with a GPS-based system.

Figure 4:
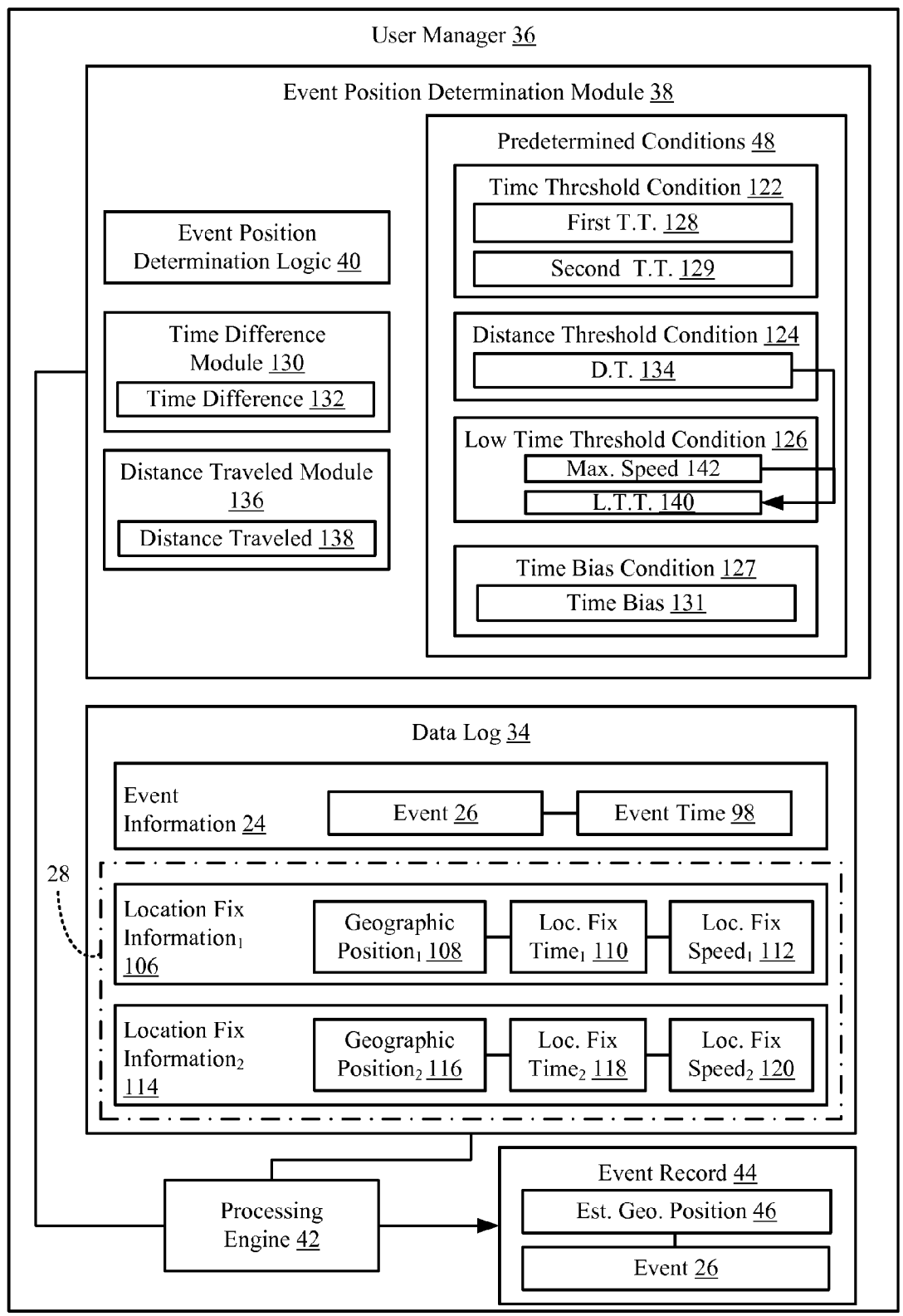
FIG. 4 is one aspect of an architecture diagram of the user manager of FIG. 1.

Referring to FIG. 4, as noted above, user manager 36 receives data log 34 from the respective wireless device 12, 14, 16, 17, 18 in order to determine if there is a geographic position that can be associated with a detected event. Event position determination module 38 includes event position determination logic 40 that reviews the information contained within data log 34 in view of one or more predetermined conditions 48 that test a perceived validity of a geographic position under consideration to be associated with event 26. For example, in one aspect, predetermined conditions 48 include a time threshold condition 122, a distance threshold condition 124, and a low time threshold condition 126. In one aspect, these conditions determine whether or not a given set of location fix information, and hence a given geographic position, is close enough to the event in a distance domain, based on speed information contained in the location fix information, to be associated with the event. Ultimately, in this aspect, these conditions attempt to select as an estimated geographic position the position associated with the location fix that is closest in distance to the actual position of the event. When speed information is not available with the location fix information, then these aspects look to the time difference between the event time and the respective location fix and, for example, select the smallest time difference.

In one aspect, for example, time threshold condition 122 includes a predetermined first time threshold value 128 corresponding to a desired maximum amount of time between the occurrence of event 26 and the time of the location fix in order for the fix to be considered for association with the event. The time threshold condition 122 may additionally include a predetermined second time threshold value 129 corresponding to a desired maximum amount of time between the occurrence of event 26 and the time of the location fix in order for the fix to be considered for association with the event. Time threshold values 128 and 129 may vary depending on the situation. For instance, a first scenario where it is known that the wireless device is moving at a relatively fast speed may have a smaller time threshold value 128 and/or 129 than a second scenario where it is known that the wireless device is moving at a relatively slow speed, i.e. a speed slower than the first scenario speed. In one aspect, event position determination logic 40 invokes a time difference module 130 to calculate a time difference 132 between event time 98 and a location fix time, such as first fix time 110 or second fix time 118, associated with a geographic position, such as first geographic position 108 or second geographic position 116, retrieved from data log 34. Further, event position determination logic 40 causes processing engine 42 to compare time difference 132 to time threshold value 128 or 129 to determine if time threshold condition 122 is achieved.

Distance threshold condition 124 includes a predetermined distance threshold value 134 corresponding to a desired maximum distance between the location of event 26 and the location of the location fix in order for the fix to be considered for association with the event. Distance threshold value 134 may vary depending on the situation. For instance, a first scenario where a user of these apparatus and methods desires a very accurate geographic position to associate with the event may have a smaller distance threshold value 134 than a second scenario where the user requires a less accurate geographic position, i.e. a position that may be further away from the actual event position when compared to the associated position in the first scenario. In one aspect, event position determination logic 40 invokes a distance traveled module 136 to calculate a distance traveled 138 based on time difference 132 associated with a given set of location fix information and a wireless device speed associated with the fix information, such as first fix speed 112 or second fix speed 120 associated, respectively, with first geographic position 108 or second geographic position 116, as retrieved from data log 34. Further, event position determination logic 40 causes processing engine 42 to compare distance traveled 138 to distance threshold value 134 to determine if distance threshold condition 124 is achieved.

Low time threshold condition 126 includes a predetermined low time threshold value 140 corresponding to a desired maximum amount of time between the occurrence of event 26 and the time of the geographic location fix, in order for the fix to be considered for association with the event, when a corresponding wireless device speed is not available with the fix. For instance, event position determination logic 40 computes low time threshold value 140 as a function of distance threshold value 134 divided by a predetermined maximum speed value 142. The predetermined maximum speed value 142 corresponds to a desired maximum speed to be associated with the respective wireless device in a situation where speed information is not available as a part of a given set of location fix information 28. Predetermined maximum speed value 142 may vary depending on the situation. For instance, predetermined maximum speed value 142 may be a higher value in a first scenario evaluating wireless devices operating on a highway when compared to a second scenario where the wireless devices are operating in city streets. In one aspect, event position determination logic 40 causes processing engine 42 to compare time difference 132 to low time threshold value 140 to determine if low time threshold condition 126 is achieved.

Time bias condition 127 includes a time bias value 131 corresponding to an average difference between the time of the location fix and the time at which the location fix is requested. The time bias value 131 may subsequently be used by the event position determination logic 40 to determine a preferred location fix from among valid pre- and post-event location fixes. In one aspect, the time difference (T1) between the pre-event location fix and the event is compared to the time difference (T2) between the post-event location fix and the event less the time bias and, if T1 is less than (T2−time bias), then the pre-event location fix is determined to be the "preferred" fix that is to be associated with the event. Conversely, if T1 is greater than or equal to (T2−time bias), then the post-event location fix is determined to be the "preferred" fix that is to be associated with the event.

It should be noted that time threshold value 128/129, distance threshold value 134 predetermined maximum speed value 142, and time bias 131 either individually or in any combination, may be set as default values, or they may be modifiable by a user of system 10.

Further, time threshold value 128/129, distance threshold value 134 predetermined maximum speed value 142 and time bias 131 can each vary depending on the scenario being tested, the environment associated with the test scenario, the type of wireless device, the type of wireless network components, the type of wireless communications protocol, the type of and retrieval speed of the particular service providing the location fix information, as well as other subjective factors, such as a desired relative accuracy or granularity of the associated geographic position. In one non-limiting example, for instance, one test scenario involved call drops by CDMA-based cellular telephones in an urban area. In this example, hundreds of sets of data were analyzed, including the call drop event and the location fix information, and it was determined that most of the valid fixes were obtained within 120 seconds of the call drop event, and based on a marketing analysis, an accuracy of 2000 feet was desired. Further, since this test scenario occurred in an urban area close to a highway, a maximum speed of 65 miles per hour was expected. Thus, in this one example, first time threshold value 128 was set at 120 seconds, distance threshold value 134 was set at 2000 feet, and maximum speed was set at 65 miles/hour. It should be stressed, however, that this is just one non-limiting example, and that each of these thresholds may vary dramatically depending on the many factors discussed above.

Based on the outcomes of testing the information contained in data log 34 against one or any combination of the predetermined conditions 48, event position determination logic 40 may be executable to associate one set of location fix information 28 with a set of event information 24, and hence to determine estimated geographic position 46 of event 26.

Event record 44 can give a ready view of estimated geographic position 46 and event 26 in any form, such as tables, maps, graphics views, plain text, interactive programs or web pages, or any other display or presentation of the data. Event record 44 includes any form of output that represents a position related characteristic or parameter, as well as any other related data, associated with the event information from data log 34 of one or more respective wireless devices.

In operation, system 10 implements a method of associating a geographic position with an event that occurs on a wireless device. In one aspect, the method evaluates at least one set of location fix information to determine if the geographic position associated with the fix is appropriate to associate with the event based on one or more conditions.

Figure 5:
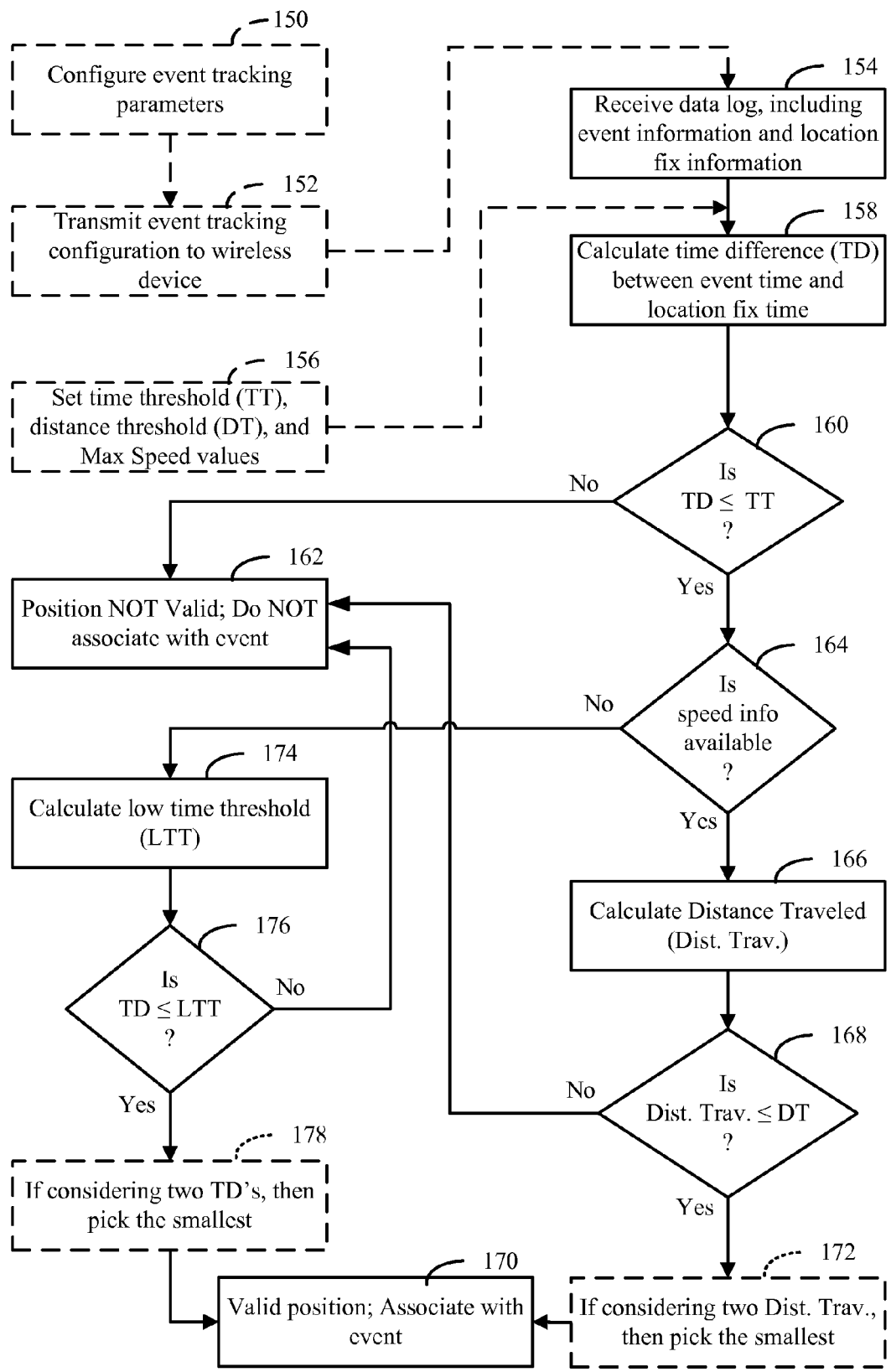
FIG. 5 is a flowchart of one aspect of a method of associating a geographic position with an event occurring on a wireless device.

In one aspect, referring to FIG. 5 for example, the method optionally involves receiving event-tracking parameters comprising an event-tracking configuration to identify a predetermined event associated with data processed by a wireless device (Block 150). The method further optionally involves transmitting the event-tracking configuration to the respective wireless device (Block 152), such as by transmitting the configuration across a wireless network. These actions may be performed, for example, by a technician, field service engineer or any other operator of user manager server 36. The result of these actions is event-tracking configuration 92 utilized by event tracking module 20 of the respective wireless device 12, 14, 16, 17, 18.

Further, the method includes receiving and storing one or more data logs from the respective wireless device, where the data logs include event information and location fix information as dictated by the event tracking configuration (Block 154). In one aspect, event tracking module 20 and location module 22 are executable by communications processing engine 82 of the respective wireless device 12, 14, 16, 17, 18 to collect event information 24 and location fix information 28 in data log 34, such as based on the detection of a predetermined event 26.

Additionally, the method may optionally include receiving settings for a predetermined first time threshold, a predetermined distance threshold and a predetermined maximum speed (Block 156). As mentioned above, these settings may be user-defined or predefined, default values of first time threshold 128, distance threshold 134 and maximum speed 142. These values may be entered into event position determination module 38 by an operator of user manager 36.

After receiving the data log, the method includes calculating a time difference between the event time and the location fix time in the data log (Block 158). In one aspect, processing engine 42 executes event position determination logic 40 to invoke time difference module 130 to calculate time difference 132, as detailed above.

The method continues by determining if the time difference meets the time threshold condition (Block 160). In one aspect, processing engine 42 executes event position determination logic 40 to compare time difference 132 to first time threshold 128, as detailed above.

If the time difference is greater than the time threshold, then the method concludes that the geographic position associated with the location fix information may not be validly associated with the event associated with the event information (Block 162).

If the time difference meets the time threshold condition, then the method continues by determining if a speed is available in association with the location fix information (Block 164).

If the speed is available, then the method continues by calculating the distance traveled (Block 166). In one aspect, processing engine 42 executes event position determination logic 40 to invoke distance traveled module 136 to calculate distance traveled 138, as detailed above. Then, the method continues by determining if the distance traveled meets the distance threshold condition (Block 168). In one aspect, processing engine 42 executes event position determination logic 40 to compare distance traveled 138 to distance threshold 134, as detailed above. If the distance traveled meets the distance threshold condition, then the method concludes that the geographic position is valid, and associates the location fix information, including the geographic position, with the event information, including the event (Block 170). In one aspect, for example, processing engine 42 executes event position determination module 38 to generate event record 44, as detailed above. Optionally, if the method reaches this point with two sets of location fix information, i.e. a first set corresponding to the closest fix before the event and a second set corresponding to the closest fix after the event, then pick the set of location fix information having the smaller of the two distances traveled (Block 172). If the distance traveled does not meet the distance threshold condition, then the method concludes that the geographic position is not valid, and no association is made between the location fix information, including the geographic position, and the event information, including the event (Block 162).

If the speed is not available, then the method continues by calculating the low time threshold (Block 174). In one aspect, processing engine 42 executes event position determination logic 40 to divide distance threshold 134 by maximum speed 142 to determine low time threshold value 140, as detailed above. Then, the method continues by determining if the time difference meets the low time threshold condition (Block 176). In one aspect, processing engine 42 executes event position determination logic 40 to compare time difference 132 to low time threshold value 140, as detailed above. If the time difference meets the low time threshold condition, then the method concludes that the geographic position is valid, and associates the location fix information, including the geographic position, with the event information, including the event (Block 170). In one aspect, for example, processing engine 42 executes event position determination module 38 to generate event record 44, as detailed above. Optionally, if the method reaches this point with two sets of location fix information, i.e. a first set corresponding to the closest fix before the event and a second set corresponding to the closest fix after the event, then pick the set of location fix information having the smaller of the two time differences (Block 178). If the time difference does not meet the low time threshold condition, then the method concludes that the geographic position is not valid, and no association is made between the location fix information, including the geographic position, and the event information, including the event (Block 162).

Other aspects of the above-defined method make decisions regarding multiple sets of location fix information.

For example, in one aspect, one set of device location and speed parameters corresponding to a location fix closest in time before the occurrence of the event may be compared to one set of device location and speed parameters corresponding to a location fix closest in time after the occurrence of the event. The fix that achieves a predetermined time threshold and a predetermined distance threshold is used to estimate the position of the wireless device during the occurrence of the event. There may be situations where both location fixes achieve these thresholds, and thus further criteria are utilized to determine the more valid fix to associate with the event.

For example, in one aspect, the distance between the location fix closest in time before the occurrence of the event and the event location, is compared to the distance between the location fix closest in time after the occurrence of the event and the event location, and the location fix corresponding to the shorter distance is chosen as the estimated position of the wireless device during the occurrence of the event.

In contrast, in another aspect, the time difference between the location fix of the wireless device closest in time before the occurrence of the event and the event time, is compared to the time difference between the location fix of the wireless device closest in time after the occurrence of the event and the event time, and the location fix corresponding to the shorter time difference is chosen as the estimated position of the wireless device during the occurrence of the event.

In the operation of these aspects, FIGS. 6-11 are flow charts illustrating a method for estimating the position of a wireless device corresponding to the occurrence of a wireless device operational event. As used herein, the term "fix" refers to a determined fixed geographical position for the wireless device, and "attached" refers to selecting a particular location fix as the estimated location corresponding to the occurrence of the event. Further, the term "applied" means under consideration for being "attached" to the event, e.g. two fixes may be "applied" to an event, but only one fix may be "attached" to the event.

The following definitions apply for the aspects described with respect to FIGS. 6-11: G1—the location fix closest in time before the event, including its relevant parameters; G2—the location fix closest in time after the event, including its relevant parameters; TT—time threshold, as defined above, given the value of 120 second in one or more aspects; DT—distance threshold, as defined above; Maximum Speed—a predetermined, configurable maximum speed, as defined above; LTT—low time threshold, as defined above; D1—estimated distance traveled by the wireless device from the location fix before the event to the event itself, determined by multiplying the speed associated with G1 by the time difference (TD1) between G1 and the event time; D2—estimated distance traveled by the wireless device from the event itself to the location fix after the event, determined by multiplying the speed associated with G2 by the time difference (TD2) between G2 and the event time; and F1, F2, F3, etc.—refer to failure events 1, 2, 3, etc. tracked according to the event tracking module.

Figure 6:
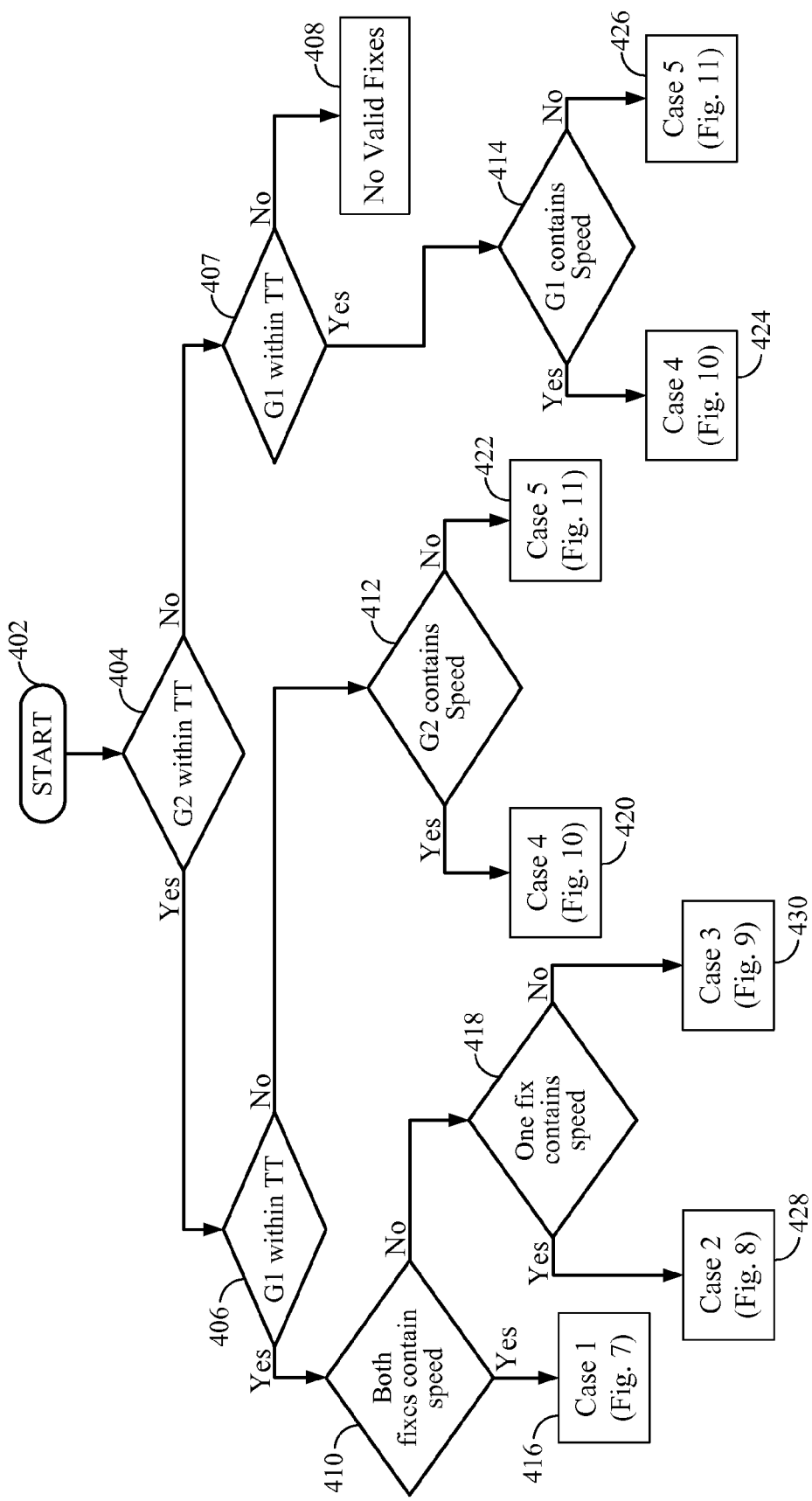
FIG. 6 is a flowchart of another exemplary general aspect using multiple thresholds to determine a position location for a wireless device corresponding to an event.

Referring to FIG. 6, after start (Block 402), if neither G1 nor G2 are within TT (Blocks 404 and 407), then there are no valid fixes that may be associated with the event (Block 408). In other words, both fixes have occurred outside of the given timeframe, and thus are not considered to validly represent the position of the event because they are too far away in time.

Figure 7:
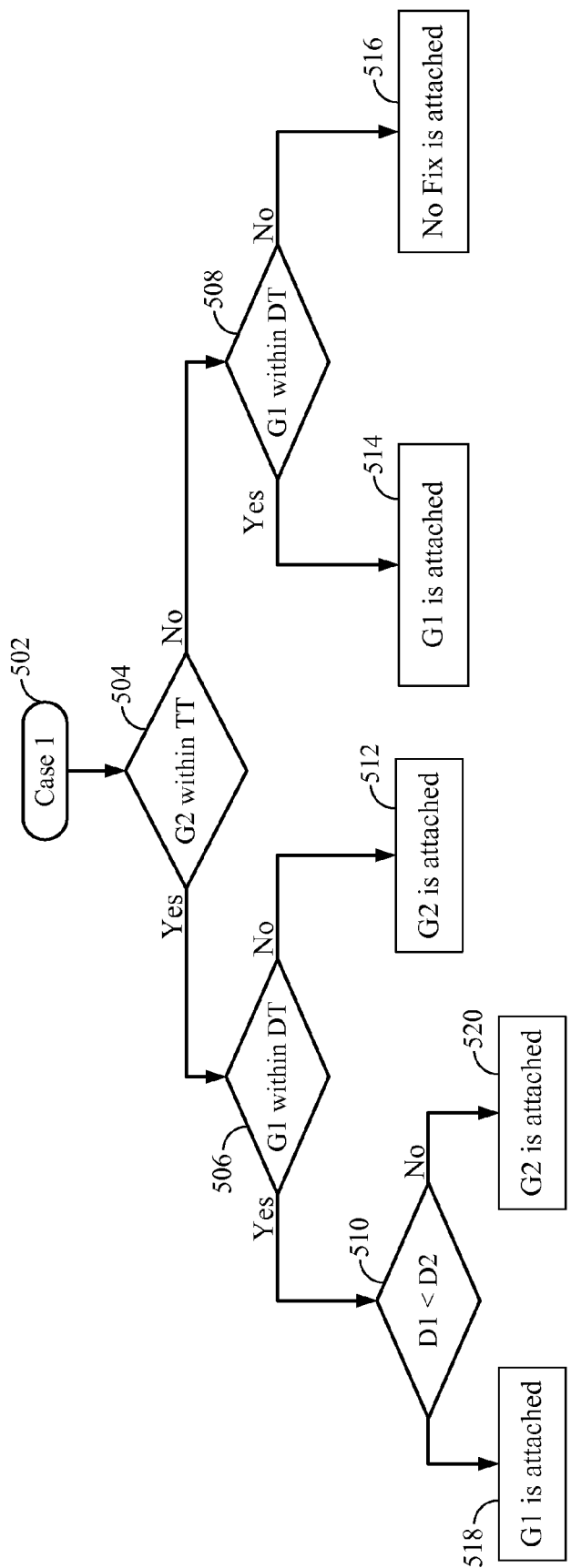
FIG. 7 is a flowchart continuation of FIG. 6 illustrating a first case scenario.

Referring back to FIG. 6, after start (Block 402), control passes to Case 1 of FIG. 7 (Block 416) if G2 is within TT (Block 404), G1 is within TT (Block 406), and both location fixes contain speed (Block 410). In other words, both fixes are within the given timeframe and contain speed information. As such, Case 1 tests these fixes against the distance threshold, and selects either the only fix within the threshold, or the location fix having the smallest distance traveled within the threshold.

Referring to FIG. 7 (Block 502), G1 is attached if (i) G2 is within DT (Block 504), G1 is within DT (Block 506), and D1<D2 (Block 510), or if (ii) G2 is not within DT (Block 504) and G1 is within DT (Block 506). G2 is attached if (i) G2 is within DT (Block 504) and G1 is not within DT (Block 506), or if (ii) G2 is within DT (Block 504), G1 is within DT (Block 506) and D2≤D1 (Block 520). If both distances are equal, then G2 is chosen because it occurs after the event and thus may be more likely to be based on the location fix request that occurs as a result of detecting the event. If G2 is not within DT (Block 504) and G1 is not within DT (Block 508), then no value is attached (Block 516). So, in this instance, although both location fixes meet the time threshold, both fall outside of the distance threshold and are thereby considered to be outside of a valid range of positions to associate with the event, as may occur when the wireless device is traveling at a high rate of speed.

Figure 8:
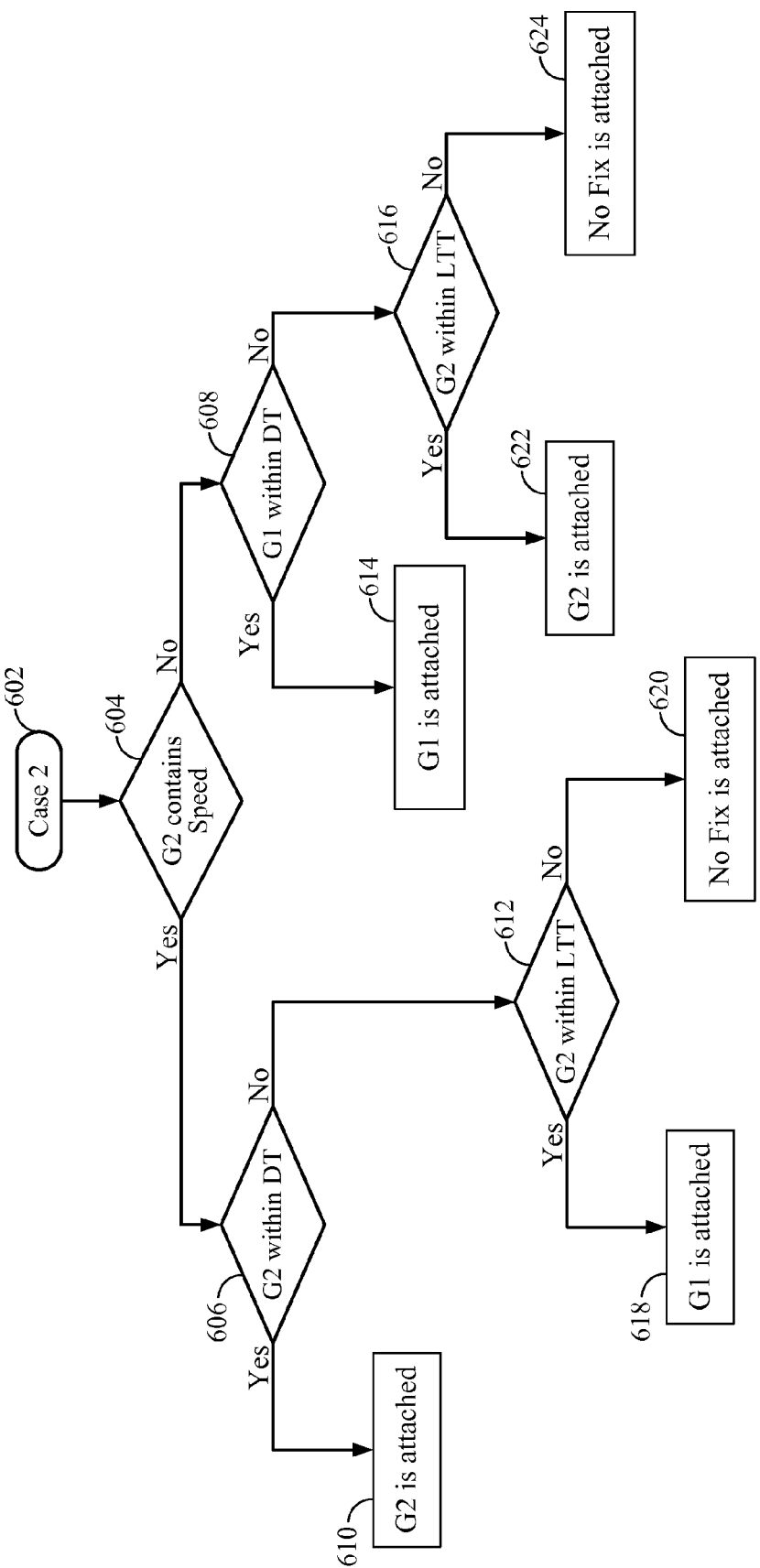
FIG. 8 is a flowchart continuation of FIG. 6 illustrating a second case scenario.

Referring back to FIG. 6, after start (Block 402), control passes to Case 2 of FIG. 8 (Block 428) if both G1 and G2 are within TT (Blocks 404, 406), and only one location fix contains speed (Blocks 410, 418). As such, Case 2 tests these two location fixes and first selects the one having speed if it falls within the distance threshold, and if not, then secondly selects the one without the speed if it falls within the low time threshold. Alternatively, Case 2 selects neither fix if none of these conditions are satisfied.

Referring to FIG. 8 (Block 602), G1 is attached (Block 618 or 614) if (i) G2 contains speed (Block 604), G2 is not within DT (Block 606), and G1 is within LTT (Block 612), or if (ii) G2 does not contain speed (Block 604) and G1 is within DT (Block 608). G2 is attached (Blocks 610 or 622) if (i) G2 contains speed (Block 604) and G2 is within DT (Block 606), or if (ii) G2 does not contain speed (Block 604), G1 is not within DT (Block 608), and G2 is within LTT (Block 616). No location fix is attached (Blocks 620 or 624) if either (i) G2 contains speed (Block 604), G2 is not within DT (Block 606), and G1 is not within LTT (Block 612), or if (ii) G2 does not contain speed (Block 604), G1 is not within DT (Block 608), and G2 is not within LTT (Block 616).

Figure 9:
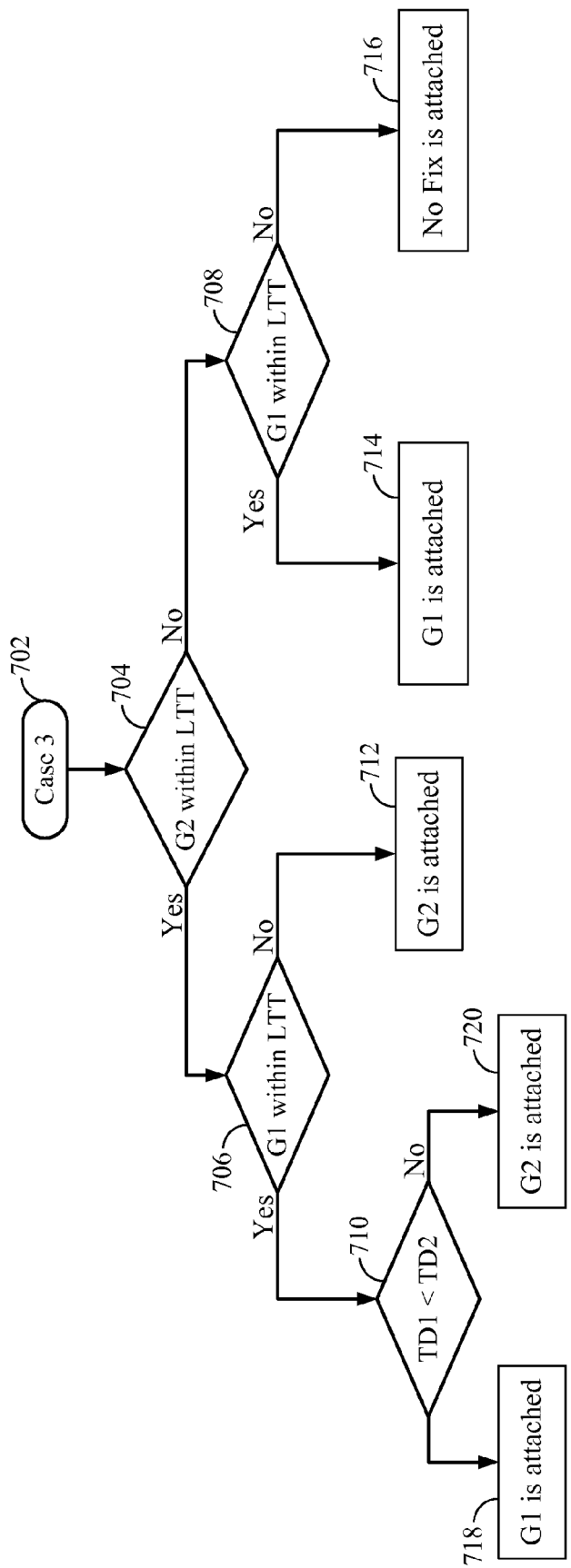
FIG. 9 is a flowchart continuation of FIG. 4 illustrating a third case scenario.

Referring back to FIG. 6, after start (Block 402), control passes to Case 3 of FIG. 9 (Block 430) if G2 is within TT (Block 404), G1 is within TT (Block 406) and neither location fix contains speed (Blocks 410, 418). As such, without having speed information to utilize, Case 3 considers the time difference between each fix and the event time, and selects either the only location fix with a time difference within the low time threshold or the location fix having the shortest time difference. If none of these conditions are satisfied, then no location fix is attached.

Referring to FIG. 9 (Block 702), G1 is attached (Block 718 or 714) if (i) G2 is within LTT (Block 704), G1 is within LTT (Block 706), and TD1<TD2 (Block 710), or if (ii) G2 is not within LTT (Block 704), and G1 is within LTT (Block 708). G2 is attached (Block 720 or 712) if (i) G2 is within LTT (Block 704), G1 is within LTT (Block 706), and TD2≤TD1 (Block 710), or if (ii) G2 is within LTT (Block 704) and G1 is not within LTT (Block 706). No location fix is attached if G2 is not within LTT (Block 704) and G1 is not within LTT (Block 708).

Figure 10:
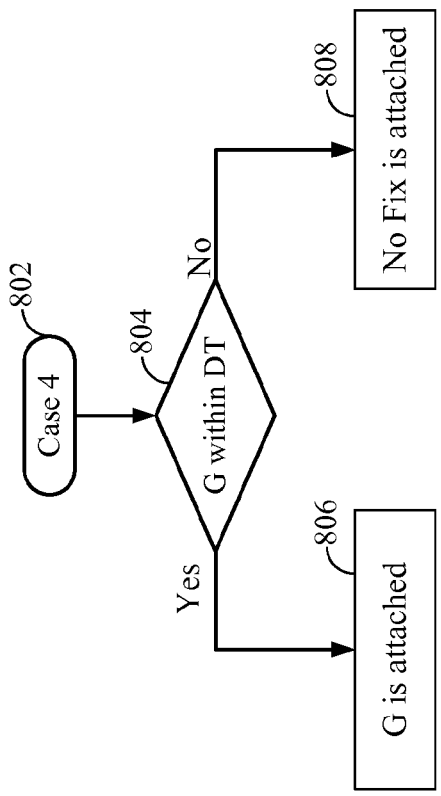
FIG. 10 is a flowchart continuation of FIG. 6 illustrating a fourth case scenario.

Referring back to FIG. 6, after start (Block 402), control passes to Case 4 of FIG. 10 (Blocks 420, 424) if either (i) G2 is within TT (Block 404), G1 is not within TT (Block 406), and G2 contains speed (Block 412), or if (ii) G2 is not within TT (Block 404), G1 is within TT (Block 407), and G1 contains speed (Block 414). As such, when only a single location fix is valid based on the time threshold and this fix includes speed information, Case 4 selects the respective location fix if it meets the distance threshold or no location fix is attached.

Referring to FIG. 10 (Block 802), the G (either G1 or G2) found to be within TT (FIG. 4) is compared to DT (Block 804). If this G is within DT, it is attached (Block 806), and if not, no G is attached (Block 808).

Figure 11:
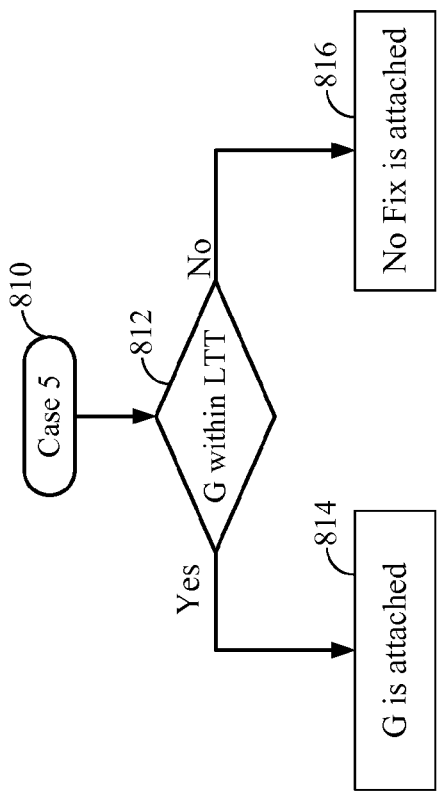
FIG. 11 is a flowchart continuation of FIG. 6 illustrating a fifth case scenario.

Referring back to FIG. 6, after start (Block 402), control passes to Case 5 of FIG. 11 (Blocks 422, 426) if either (i) G2 is within TT (Block 404), G1 is not within TT (Block 406), and G2 does not contain speed (Block 412), or if (ii) G2 is not within TT (Block 404), G1 is within TT (Block 407), and G1 does not contain speed (Block 414). As such, when only a single location fix is valid based on the time threshold but this location fix does not include speed information, Case 5 selects the respective location fix if it has a time difference within the low time threshold, or no location fix is attached.

Referring to FIG. 11 (Block 810), the G (either G1 or G2) found to be within TT (FIG. 4) is compared to LTT (Block 812). If this G is within LTT, it is attached (Block 814), and if not, no G is attached (Block 816).

FIGS. 12-29 are time line examples illustrating the above-noted predetermined conditions. In each of these figures, it should be noted that the timeline scenarios include the following parameters: Time Threshold (TT)=120 seconds; Distance Threshold (DT)=609.6 meters, or 2000 feet; Maximum Speed=29.05 meters/second or 65 miles/hour; and, based on DT/(Maximum Speed), Low Time Threshold (LTT)=20.97 seconds.

Beginning with FIGS. 12 and 13, these figures illustrate that it is possible to apply up to two location fixes to each event that has not yet had a location fix associated with it. In FIG. 12, G1 904 and G2 912 are applied to F2 906, F3 908 and F4 910 because G1 is the last location fix to come before the respective failure and G2 is the first location fix to come after the respective failure. In contrast, G2 912 is not applied to F1 902 because G1 904, which is before G2 with respect to the timing of F1, has already been applied to it. In FIG. 13, G1 1008 will be applied to F1 1002, F2 1004 and F3 1006 because there was no previous location fix before these failure events. As such, FIG. 13 illustrates the situation where only one set of location fix information may be utilized in order to determine a geographic position to associate with a detected event on the wireless device.

Figures 14, 15:
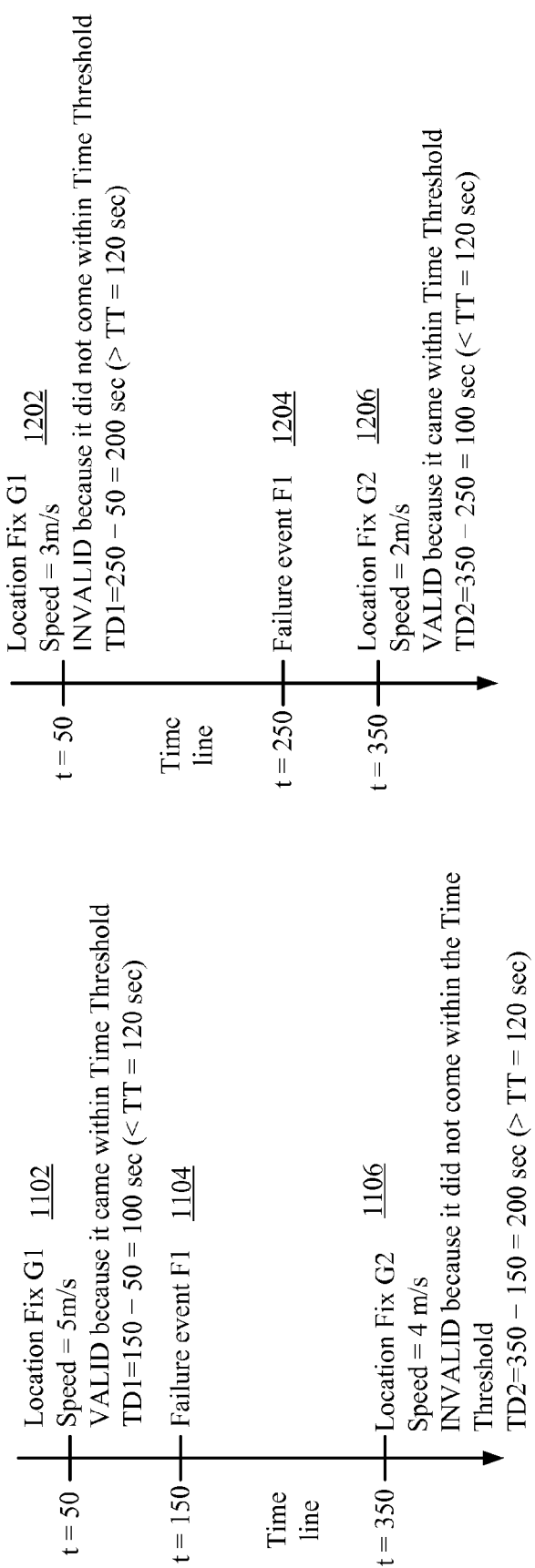
FIGS. 14 and 15 are exemplary time line examples pertaining to the aspect of FIG. 6.

FIGS. 14 and 15 are general cases for the above noted logic of FIG. 6. In FIG. 14, G1 1102 is valid for F1 1104 because it came within TT, but G2 1106 is invalid because it is not within TT. In FIG. 15, G2 1206 is valid because it came within TT relative to F1 1204, but G1 1202 is invalid because it is not within TT.

Figures 16, 17:
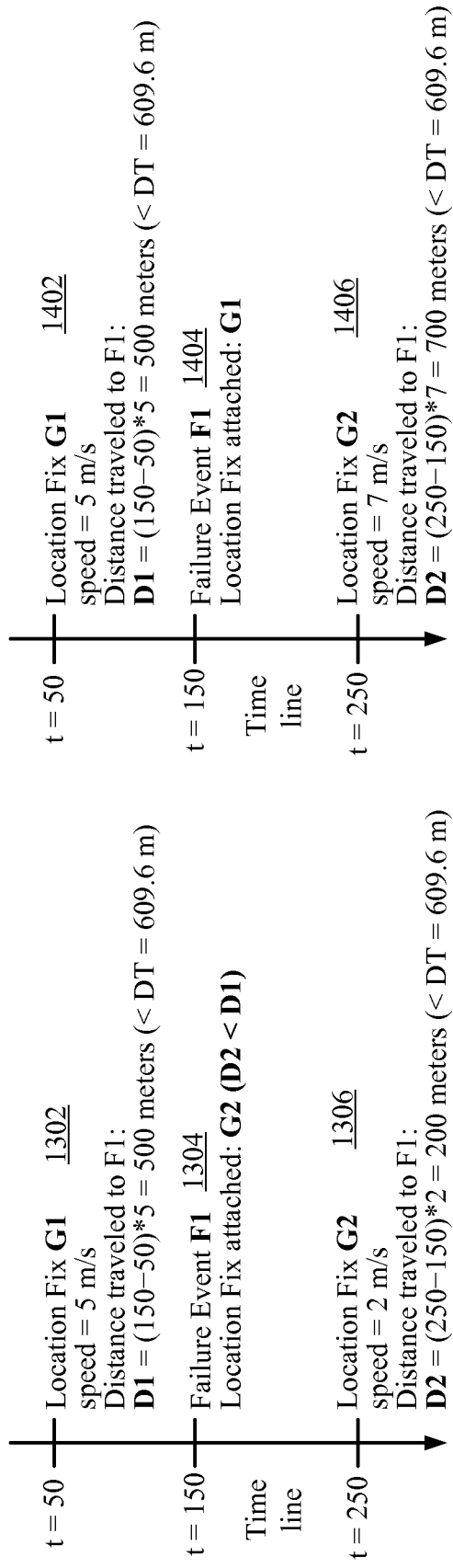
Figures 18, 19:
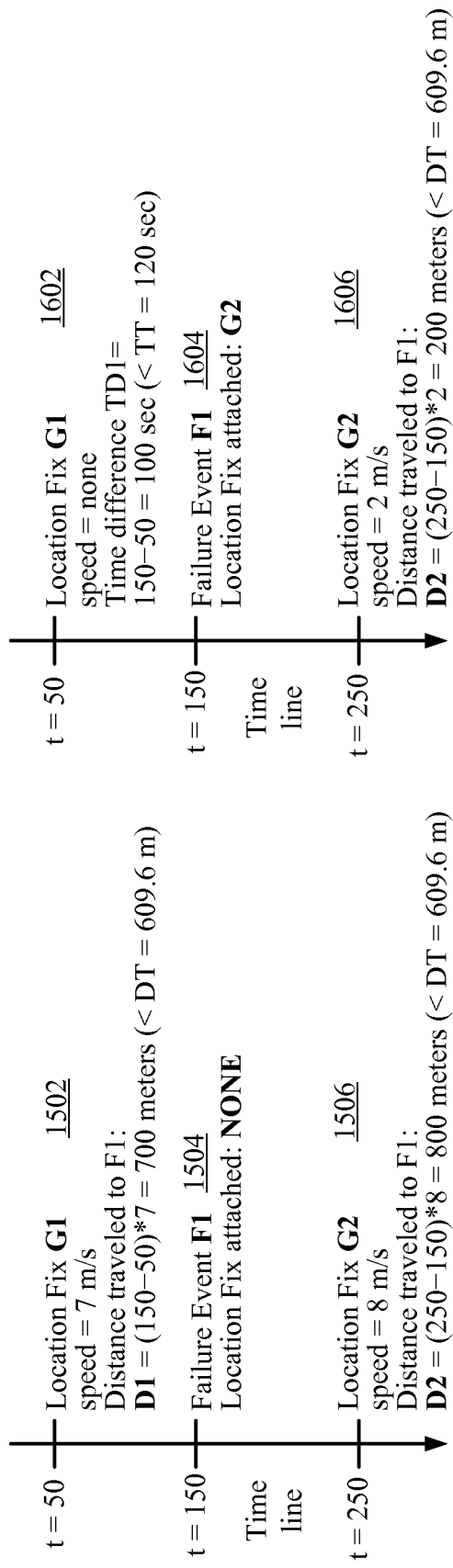

FIGS. 16-18 demonstrate Case 1 of FIG. 7. In FIG. 16, G2 1306 is attached because both G1 1302 and G2 1306 are within DT relative to F1 1304, and D2 is less than D1. In FIG. 17, G1 1402 is attached because relative to F1 1404, G1 1402 is within DT and G2 1406 is outside of DT. In FIG. 18, no location fix is attached, because, relative to F1 1504, neither G1 1502 nor G2 1506 are within DT.

Figures 22, 23:
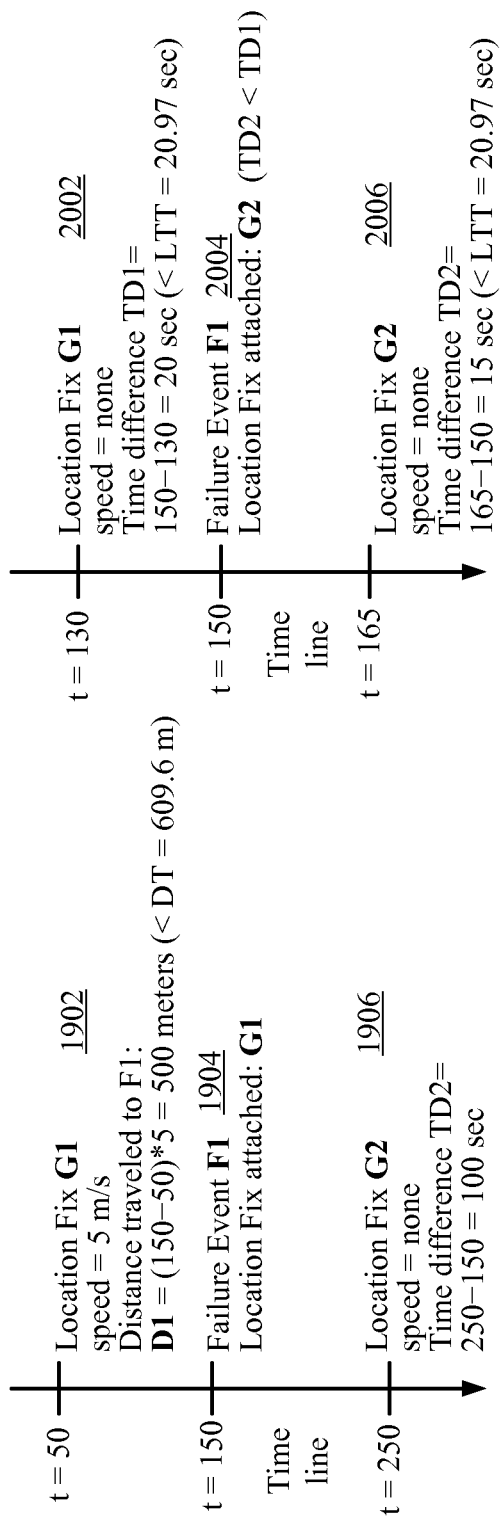

FIGS. 19-22 demonstrate Case 2 of FIG. 8. In FIG. 19, G2 1606 is attached because G2 contains speed and is within DT, and thus gets priority over G1 1602, which is also within DT relative to F1 1604 but does not contain speed. In FIG. 20, G1 1702 is attached because G2 1706 contains speed but is not within DT relative to F1 1704, and G1 is within LTT. In FIG. 21, no location fix is attached because G2 1806 contains speed but is not within DT relative to F1 1804, and G1 1802 is not within LTT. In FIG. 22, G1 1902 is attached because G2 1906 does not contain speed, and G1 contains speed and is within DT relative to F1 1904.

FIGS. 23-25 demonstrate Case 3 of FIG. 9. In FIG. 23, G2 2006 is attached because G2 is within LTT, and event though G1 2002 is within LTT, G2 is selected because TD2<TD1 relative to F1 2004. In FIG. 24, even though both G1 2102 and G2 2106 are within TT relative to F1 2104, G2 2106 is attached because G2 2106 is within LTT and G1 2102 is not within LTT. In FIG. 25, although both G1 2202 and G2 2206 are within TT relative to F1 2204, no location fix is attached because neither G1 nor G2 are within LTT.

FIGS. 26 and 27 demonstrate Case 4 of FIG. 10. In FIG. 26, G2 2306 is attached because G1 2302 is not within TT and G2 contains speed and is within DT relative to F1 2304. In FIG. 27, no location fix is attached because G2 2406 is not within TT and G1 2402 is not within DT relative to F1 2404.

FIGS. 28 and 29 demonstrate Case 5 of FIG. 11. In FIG. 28, G2 2506 is attached because G1 2502 is not within TT relative to F1 2504 and G2 is within LTT. In FIG. 29, no location fix is attached because G2 2606 is not within TT relative to F1 2604 and G1 2602 is not within LTT.

Figure 30:
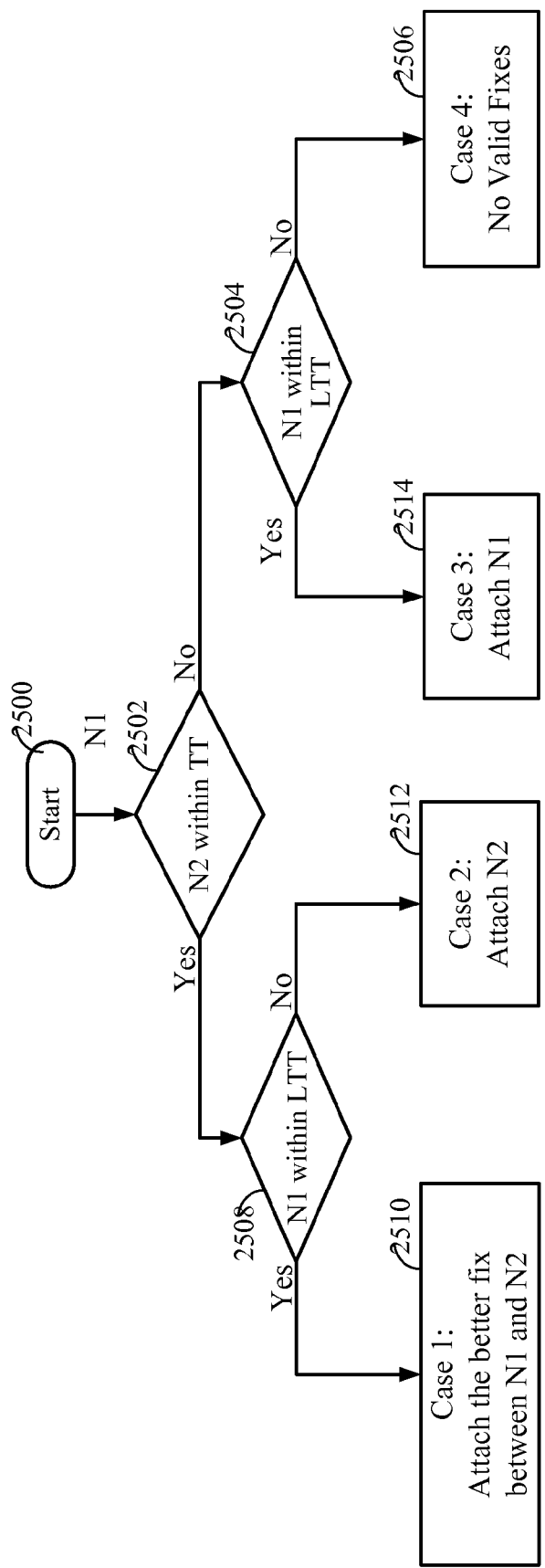
FIG. 30 is a flowchart of another exemplary general aspect using multiple thresholds to determine a position location for a wireless device corresponding to an event.

In the operation of further aspects, FIG. 30 is a flow chart illustrating a method for estimating the position of a wireless device corresponding to the occurrence of a wireless device operational event. In the aspect illustrated in FIG. 30 the location fixes having QoS that result in fixes based at least partly on terrestrial wireless communication measurements. Such fixes, which may have the QoS adjusted downward, are characteristically fixes that provide for minimal search time and, thus, the resulting location fix is characteristically based on terrestrial measurements as opposed to satellite measurements, which generally take longer periods of time to acquire. In certain aspects in which the wireless device is unable to obtain satellite-based location fixes due to, for example, the inability to currently receive satellite signals or the like or the wireless device is not configured to provide for satellite-based location determination, the wireless device may rely on QoS adjusted location fixes and in particular downward adjusted QoS location fixes. Lower QoS location fixes generally occur in less time than corresponding high QoS location fixes. As previously noted certain location determination modes, such as Mobile Station-Assisted (MS-Assisted) mode may be configured to obtain both a terrestrial-based fix and a satellite-based fix depending on the QoS applied to the mode. In this regard, the terrestrial-based location, while typically less precise accurate than the satellite-based fix, may be relied upon if the MS-Assisted mode is set to a lower QoS due to, for example, the inability to return a satellite-based fix. In other instances, in which precision accuracy of the fix may be sacrificed to insure the timeliness of the fix (e.g., when associating a fix with the event or the like), a lower adjusted QoS location fix may be the preferred fix.

As previously noted, the term "fix" refers to a determined fixed geographical position for the wireless device, and "attached" refers to selecting a particular location fix as the estimated location corresponding to the occurrence of the event. Further, the term "applied" means under consideration for being "attached" to the event, e.g. two fixes may be "applied" to an event, but only one fix may be "attached" to the event.

The following definitions apply for the aspects described with respect to FIG. 30: N1—the location fix based at least partly on terrestrial wireless communication measurements closest in time before the event, including its relevant parameters; N2—the location fix based at least partly on terrestrial wireless communication measurements closest in time after the event, including its relevant parameters; TT—second time threshold, as defined above, given the value of 240 second in one or more aspects; LTT—low time threshold, as defined above; Time Bias—time bias, as defined above, given the value of 6 seconds in one or more aspects.

Referring to FIG. 30, after start (Block 2500), if neither N2 is within TT (Block 2502) nor N1 within LTT (Block 2504), then there are no valid location fixes that may be associated with the event (Block 2506). In other words, both location fixes have occurred outside of the given timeframe, and thus are not considered to validly represent the position of the event because they are too far away in time.

Figures 33, 34:
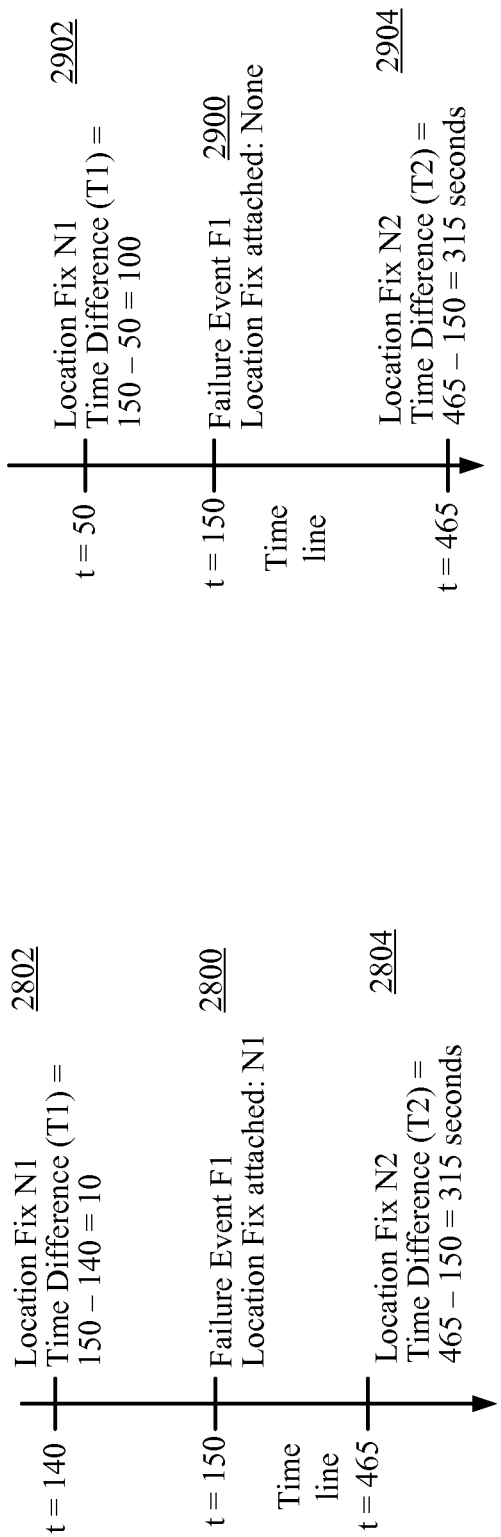

FIG. 34 provides a timeline representation example of a case in which N1 is not within LTT, N2 is not within TT and thus no valid location fix exists and no location fix is attached to the event. In the example shown in FIG. 34, the Time Threshold (TT) is set to 240 seconds, the Low Time Threshold (LTT) is set to 20.97 seconds and the time bias is set to 6 seconds. The failure event (F1) 2900 occurs at the 150 second mark along the timeline. The pre-event location fix (N1) 2902 occurs at the 50 second mark along the timeline. Thus, the time difference between F1 2900 and the N1 2902 (150 seconds–50 seconds) is 100 seconds, which is greater than the LTT of 20.97 seconds. Thus, N1 2902 is determined to be an invalid location fix. The post-event location fix (N2) 2904 occurs at the 465 second mark along the timeline. Thus, the time difference between N2 2904 and F1 2900 (465 seconds–150 seconds) is 315 seconds, which is greater than the TT of 240 seconds. Thus, N2 2904 is determined to be an invalid location fix. Since neither N1 2902 nor N2 2904 are valid, no location fix is attached to the event.

Referring back to FIG. 30, after start (2500), control passes to Case 1 of FIG. 31 (Block 2510) and the "preferred" location fix is attached to the event, if N2 is within TT (Block 2502) and N1 is within LTT (Block 2508). In other words, both location fixes are within the given timeframe and are considered. As such, Case 1 determines the "preferred" location fix based on a comparison of the time difference (T1) between N1 and F1 and the time difference (T2) between N2 and F1 less the time bias.

FIG. 31 provides a timeline representation example of a case in which N1 is within LTT, N2 is within TT, thus both location fixes are valid and a "preferred" location fix determination is required. In the example shown in FIG. 31, the Time Threshold (TT) is set to 240 seconds, the Low Time Threshold (LTT) is set to 20.97 seconds and the time bias is set to 6 seconds. The failure event (F1) 2600 occurs at the 150 second mark along the timeline. The pre-event location fix (N1) 2602 occurs at the 140 second mark along the timeline. Thus, the time difference (T1) between F1 2600 and N1 2602 (150 seconds–140 seconds) is 10 seconds. The post-event location fix (N2) 2604 occurs at the 165 second mark along the timeline. Thus, the time difference (T2) between N2 2604 and F1 (165 seconds–150 seconds) is 15 seconds and less the 6 second time bias (15 seconds–6 seconds) the result is 9 seconds. Since, T2 less the time bias (9 seconds) is less than T1 (10 seconds), N2 2604 is determined to be the "preferred" location fix and is attached to the event.

Referring back to FIG. 30, after start (2500), control passes to Case 2 of FIG. 32 (Block 2512) and the N2 location fix is attached to the event, because N2 is within TT (Block 2502) and N1 is not within LTT (Block 2508). In other words, only the N2 is valid and therefore it is attached to the event.

FIG. 32 provides a timeline representation example of a case in which N2 is within TT, N1 is not within LTT, thus only N2 valid and N2 is attached to the event. In the example shown in FIG. 32, the Time Threshold (TT) is set to 240 seconds, the Low Time Threshold (LTT) is set to 20.97 seconds and the time bias is set to 6 seconds. The failure event (F1) 2700 occurs at the 150 second mark along the timeline. The pre-event location fix (N1) 2702 occurs at the 50 second mark along the timeline. Thus, the time difference (T1) between F1 2700 and N1 2702 (150 seconds–50 seconds) is 100 seconds, which is greater than LTT of 20.97 seconds and, thus N1 is not a valid fix. The post-event location fix (N2) 2704 occurs at the 165 second mark along the timeline. Thus, the time difference (T2) between N2 2704 and F1 2700 (165 seconds–150 seconds) is 15 seconds, which is less than the TT of 240 seconds, thus N2 is a valid location fix and is attached to the event.

Referring back to FIG. 30, after start (2500), control passes to Case 3 of FIG. 33 (Block 2514) and the N1 location fix is attached to the event, because N1 is within LTT (Block 2504) and N2 is not within LTT (Block 2502). In other words, only the N1 location fix is valid and therefore it is attached to the event.

FIG. 33 provides a timeline representation example of a case in which N1 is within LTT, N2 is not within TT, thus only N1 valid and N1 is attached to the event. In the example shown in FIG. 33, the Time Threshold (TT) is set to 240 seconds, the Low Time Threshold (LTT) is set to 20.97 seconds and the time bias is set to 6 seconds. The failure event (F1) 2800 occurs at the 150 second mark along the timeline. The pre-event location fix (N1) 2802 occurs at the 140 second mark along the timeline. Thus, the time difference (T1) between F1 2800 and N1 2802 (150 seconds–140 seconds) is 00 seconds, which is less than LTT of 20.97 seconds and, thus N1 is a valid fix. The post-event location fix (N2) 2804 occurs at the 465 second mark along the timeline. Thus, the time difference (T2) between N2 2804 and F1 2800 (465 seconds–150 seconds) is 315 seconds, which is greater than the TT of 240 seconds, thus N2 is not a valid location fix and N1 is attached to the event.

Additionally, it should be noted that the method may include granting access to event record 44 and/or data log 34 to other business or commercial systems. To ensure the security and/or integrity of the collected position data, such access may be granted in a monitored fashion such as through a user manager. Further, other computer devices, including both storage and processing devices, can be located across the wireless network from the wireless device, and accordingly, the architecture associated with the user manager is readily scalable.

In summary, wireless device 12, 14, 16, 17, 18 can have at least one application or agent resident (either permanent or temporarily) on the computer platform 56 thereof which causes the gathering of event information 24 and location fix information 28 from communications processing engine 82, and which can effect selective transmission of data log 34 for that wireless device to another computer device (such as user manager server 36) on the wireless network 32. If the wireless device 12, 14, 16, 17, 18 is so embodied, data log 34 may be transmitted over an open communication connection from the wireless device 12, 14, 16, 17, 18 to the wireless network 32, such as an open voice or data call. If the wireless device is a cellular telephone 12 and the wireless network is a cellular telecommunication network, such as shown in FIG. 2, data log 34 can be transmitted through short message service or other wireless communication methods.

In view of portions of the method being executable on computer platform 56 of a wireless device 12, 14, 16, 17, 18 and executed by processing engine 42 of user manager 36, the method includes a program resident in a computer readable medium, where the program directs a wireless device 12, 14, 16, 17, 18 having a device platform 56 to perform collection, storage and transmission acts of the method. Such a program can be executed on any single computer platform, or can be executed in a distributed way among several computer platforms. Furthermore, the method can be implemented by a program that directs a computer device such as user manager server 36 to evaluate the validity of a geographic position in association with an event through gathering and processing data log 34 from the wireless devices 12, 14, 16, 17, 18.

The computer readable medium can be the memory 78 of the computer platform 56 of the cellular telephone 12, or other wireless device 14, 16, 17, 18, or can be in a local database, such as local database 80 of the device platform 50, or can be a data repository associated with user manager 36. Further, the computer readable medium can be in a secondary storage media that is loadable onto a wireless device computer platform or user manager, such as a magnetic disk or tape, optical disk, hard disk, flash memory, or other storage media as is known in the art.

Further, the method may be implemented, for example, by operating portion(s) of the wireless network 32 and/or LAN 72, such as device platform 56 and user manager server 36, to execute a sequence of machine-readable instructions. The instructions can reside in various types of signal-bearing or data storage primary, secondary, or tertiary media. The media may comprise, for example, RAM (not shown) accessible by, or residing within, the components of the wireless network 32 or LAN 58. Whether contained in RAM, a diskette, or other secondary storage media, the instructions may be stored on a variety of machine-readable data storage media, such as DASD ("direct access storage device") storage (e.g., a conventional "hard drive" or a RAID ("redundant array of independent disks") array), magnetic tape, electronic read-only memory (e.g., ROM, EPROM, or EEPROM), flash memory cards, an optical storage device (e.g. CD-ROM, WORM (write once, read many), DVD, digital optical tape), paper "punch" cards, or other suitable data storage media including digital and analog transmission media.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

Many modifications and other aspects will come to mind to one skilled in the art to which this invention pertains having the benefit of the teachings presented in the foregoing descriptions and the associated drawings. Therefore, it is to be understood that the aspect is not to be limited to the specific aspects disclosed and that modifications and other aspects are intended to be included within the scope of the appended claims. Although specific terms are employed herein, they are used in a generic and descriptive sense only and not for purposes of limitation. Accordingly, the described aspects are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for estimating a geographical position corresponding to a wireless device event, comprising:
   receiving at least one of a first geographical position data of the wireless device corresponding to a first location fix having a first Quality of Service (QoS) and a second geographical position data of the wireless device corresponding to a second location fix having a second QoS, wherein the first and second QoS result in fixes based at least partly on terrestrial wireless communication measurements, wherein at least one of the first geographical position data and the second geographical position data are derived from a Mobile Station-Assisted (MS-Assisted) mode of location determination;
   determining an estimated geographical position of the wireless device based on a predetermined relationship between the event and at least one of the first geographical position data and the second geographical position data, wherein determining an estimated geographical position of the wireless device based on a predetermined relationship comprises selecting the estimated geographical position of the wireless device from one of the first geographical position data of the wireless device and the second geographical position data of the wireless device, wherein the predetermined relationship comprises one or more time relationships comprising a time difference between (a) a time corresponding to the event and (b) a time corresponding to any one of: the first geographical position data and the second geographical position data;
   comparing the one or more time relationships to one or more corresponding predetermined time thresholds, wherein the one or more predetermined time thresholds comprise a predetermined time threshold and a low time threshold; and
   selecting the first geographic position data as a basis for the estimated geographic position if, the first geographical position data corresponds to a first fixed geographical position of the wireless device before a time corresponding to the event and the first time difference between (a) a time corresponding to the first geographical position data, and (b) a time corresponding to the event is within the low time threshold, and the second geographical position data corresponds to a second fixed geographic position of the wireless device after the time corresponding to the event and the second time difference between (a) the time corresponding to the first geographical position data, and (b) a time corresponding to the event is outside of the predetermined time threshold.

2. The method according to claim 1, wherein at least one of the one of the first geographical position data and the second geographical position data correspond to an Advanced Forward Link Trilateration (AFLT) location fix.

3. The method according to claim 1, wherein the event corresponds to a predetermined operation of the wireless device.

4. The method according to claim 3, wherein the event corresponds to one or more predetermined configurable sequences of data associated with the operation of the wireless device.

5. The method according to claim 1, wherein the predetermined time threshold comprises a predetermined maximum time difference between (a) a time corresponding to either one of the first geographical position data of the wireless device and the second geographical position data of the wireless device, and (b) a time corresponding to the event.

6. The method according to claim 1, wherein the low time threshold comprises a time taken by the wireless device to travel a predetermined distance threshold at a predetermined maximum speed.

7. The method according to claim 1, further comprising:
receiving, from a position determination entity, a third geographical position data of the wireless device corresponding to a third location fix; and
wherein the determining further comprises determining the estimated geographical position of the wireless device based on a predetermined relationship between the event and the third geographical position data.

8. The method according to claim 1, further comprising determining a preferred geographical position data from among the first and second geographical position data based on a comparison of the first time difference to the second time difference less a time bias, where the time bias is defined as an average difference between (a) a time corresponding to geographical position data and (c) the time corresponding to a request for the geographical position data.

9. The method according to claim 8, further comprising selecting the first geographical position data as a basis for the estimated geographic position if the first time difference is less than the second time difference less the time bias.

10. The method according to claim 8, further comprising selecting the second geographic position data as a basis for the estimated geographic position if the first time difference is greater than or equal to the second time difference less the time bias.

11. The method according to claim 7, wherein the event corresponds to one or more predetermined configurable sequences of data associated with the operation of the wireless device.

12. The method according to claim 3, wherein the event corresponds to one or more predetermined configurable sequences of data associated with the operation of the wireless device.

13. A method for estimating a geographical position corresponding to a wireless device event, comprising:
receiving at least one of a first geographical position data of the wireless device corresponding to a first location fix having a first Quality of Service (QoS) and a second geographical position data of the wireless device corresponding to a second location fix having a second QoS, wherein the first and second QoS result in fixes based at least partly on terrestrial wireless communication measurements, wherein at least one of the first geographical position data and the second geographical position data are derived from a Mobile Station-Assisted (MS-Assisted) mode of location determination;
determining an estimated geographical position of the wireless device based on a predetermined relationship between the event and at least one of the first geographical position data and the second geographical position data, wherein determining an estimated geographical position of the wireless device based on a predetermined relationship comprises selecting the estimated geographical position of the wireless device from one of the first geographical position data of the wireless device and the second geographical position data of the wireless device, wherein the predetermined relationship comprises one or more time relationships comprising a time difference between (a) a time corresponding to the event and (b) a time corresponding to any one of: the first geographical position data and the second geographical position data;
comparing the one or more time relationships to one or more corresponding predetermined time thresholds, wherein the one or more predetermined time thresholds comprise a predetermined time threshold and a low time threshold; and
selecting the second geographic position data as a basis for the estimated geographic position if, the first geographical position data corresponds to a first fixed geographical position of the wireless device before a time corresponding to the event and the first time difference between (a) a time corresponding to the first geographical position data, and (b) a time corresponding to the event is outside of the low time threshold, and the second geographical position data corresponds to a second fixed geographic position of the wireless device after the time corresponding to the event and the second time difference between (a) the time corresponding to the first geographical position data, and (b) a time corresponding to the event is within the predetermined time threshold.

14. The method according to claim 13, wherein at least one of the one of the first geographical position data and the second geographical position data correspond to an Advanced Forward Link Trilateration (AFLT) location fix.

15. The method according to claim 13, wherein the event corresponds to a predetermined operation of the wireless device.

16. The method according to claim 13, further comprising determining a preferred geographical position data from among the first and second geographical position data based on a comparison of the first time difference to the second time difference less a time bias, where the time bias is defined as an average difference between (a) a time corresponding to geographical position data and (c) the time corresponding to a request for the geographical position data.

17. The method according to claim 16, further comprising selecting the first geographical position data as a basis for the estimated geographic position if the first time difference is less than the second time difference less the time bias.

18. The method according to claim 16, further comprising selecting the second geographic position data as a basis for the estimated geographic position if the first time difference is greater than or equal to the second time difference less the time bias.

19. The method according to claim 13, further comprising:
receiving, from a position determination entity, a third geographical position data of the wireless device corresponding to a third location fix; and
wherein the determining further comprises determining the estimated geographical position of the wireless device based on a predetermined relationship between the event and the third geographical position data.

20. A method for estimating a geographical position corresponding to a wireless device event, comprising:
receiving at least one of a first geographical position data of the wireless device corresponding to a first location fix having a first Quality of Service (QoS) and a second geographical position data of the wireless device corresponding to a second location fix having a second QoS, wherein the first and second QoS result in fixes based at least partly on terrestrial wireless communication measurements, wherein at least one of the first geographical position data and the second geographical position data are derived from a Mobile Station-Assisted (MS-Assisted) mode of location determination;

determining an estimated geographical position of the wireless device based on a predetermined relationship between the event and at least one of the first geographical position data and the second geographical position data, wherein determining an estimated geographical position of the wireless device based on a predetermined relationship comprises selecting the estimated geographical position of the wireless device from one of the first geographical position data of the wireless device and the second geographical position data of the wireless device, wherein the predetermined relationship comprises one or more time relationships comprising a time difference between (a) a time corresponding to the event and (b) a time corresponding to any one of: the first geographical position data and the second geographical position data;

comparing the one or more time relationships to one or more corresponding predetermined time thresholds, wherein the one or more predetermined time thresholds comprise a predetermined time threshold and a low time threshold; and selecting one of the first geographical position data and the second geographical position data as a basis for the estimated geographical position if: the first geographical position data corresponds to a first fixed geographical position of the wireless device before a time corresponding to the event and the first time difference between (a) a time corresponding to the first geographical position data, and (b) a time corresponding to the event is within the low time threshold, and the second geographical position data corresponds to a second fixed geographic position of the wireless device after the time corresponding to the event and the second time difference between (a) a time corresponding to the first geographical position data, and (b) a time corresponding to the event is within the predetermined time threshold.

21. The method according to claim 20, further comprising determining a preferred geographical position data from among the first and second geographical position data based on a comparison of the first time difference to the second time difference less a time bias, where the time bias is defined as an average difference between (a) a time corresponding to geographical position data and (c) the time corresponding to a request for the geographical position data.

22. The method according to claim 21, further comprising selecting the first geographical position data as a basis for the estimated geographic position if the first time difference is less than the second time difference less the time bias.

23. The method according to claim 21, further comprising selecting the second geographic position data as a basis for the estimated geographic position if the first time difference is greater than or equal to the second time difference less the time bias.

24. The method according to claim 20, wherein at least one of the one of the first geographical position data and the second geographical position data correspond to an Advanced Forward Link Trilateration (AFLT) location fix.

25. The method according to claim 20, wherein the event corresponds to a predetermined operation of the wireless device.

26. The method according to claim 20, further comprising:
receiving, from a position determination entity, a third geographical position data of the wireless device corresponding to a third location fix; and
wherein the determining further comprises determining the estimated geographical position of the wireless device based on a predetermined relationship between the event and the third geographical position data.

27. An apparatus for estimating a geographical position corresponding to a wireless device event, comprising:
an event position determination module operable to receive at least one of a first set of location fix information of the wireless device corresponding to a first location fix having a first Quality of Service (QoS) and a second set of location fix information of the wireless device corresponding to a second location fix having a second QoS, wherein the first and second QoS result in fixes based at least partly on terrestrial wireless communication measurements;
event position determination logic included in the module and operable to:
determine an estimated geographical position of the wireless device to associate with the event based on a predetermined relationship between the event and at least one of the first set of location fix information and the second set of location fix information, wherein the event corresponds to a predetermined operation of the wireless device;
determine the estimated geographical position based upon selecting one of the first location fix information and the second location fix information, wherein the predetermined relationship comprises one or more time relationships comprising a time difference between (a) an event time corresponding to the event and (b) a time corresponding to either one of the first location fix information and the second location fix information,
compare the one or more time relationships to one or more corresponding predetermined time thresholds; and
select the first location fix information as a basis for the estimated geographic position if, the first location fix information corresponds to a first fixed geographical position of the wireless device before a time corresponding to the event and a first time difference between (a) a time corresponding to the first location fix information, and (b) a time corresponding to the event is within the low time threshold, and the second location fix information corresponds to a second fixed geographic position of the wireless device after the time corresponding to the event and a second time difference between (a) the time corresponding to the first location fix information, and (b) a time corresponding to the event is outside of the predetermined time threshold.

28. The apparatus of claim 27, wherein at least one of the one of the first geographical position data and the second geographical position data correspond to an Advanced Forward Link Trilateration (AFLT) location fix.

29. The apparatus according to claim 27, wherein the event corresponds to a predetermined operation of the wireless device.

30. The apparatus according to claim 29, wherein the event corresponds to one or more predetermined configurable sequences of data associated with an operation of the wireless device.

31. The apparatus according to claim 27, wherein the predetermined time threshold comprises predetermined maximum time difference between (a) a time corresponding to either one of the first location fix information and the second location fix information, and (b) the event time.

32. The apparatus according to claim 27, wherein the low time threshold comprises a time taken by the wireless device to travel the predetermined distance threshold at a predetermined maximum speed.

33. The apparatus according to claim 27, wherein the event position determination module is further operable to:
receive, from a position determination entity, a third set of location fix information; and
determine the estimated geographical position of the wireless device based on a predetermined relationship between the event and the third set of location fix information.

34. The apparatus according to claim 27, wherein the event position logic is further operable to determining a preferred location fix information from among the first and second location fix information based on a comparison of the first time difference to the second time difference less a time bias, where the time bias is defined as an average difference between (a) a time corresponding to location fix information and (c) the time corresponding to a request for the location fix information.

35. The apparatus according to claim 34, wherein the event position logic is further operable to select the first location fix information as a basis for the estimated geographic position if the first time difference is less than the second time difference less the time bias.

36. The apparatus according to claim 34, wherein the event position logic is further operable to select the second location fix information as a basis for the estimated geographic position if the first time difference is greater than or equal to than or equal to the second time difference less the time bias.

37. An apparatus for estimating a geographical position corresponding to a wireless device event, comprising:
an event position determination module operable to receive at least one of a first set of location fix information of the wireless device corresponding to a first location fix having a first Quality of Service (QoS) and a second set of location fix information of the wireless device corresponding to a second location fix having a second QoS, wherein the first and second QoS result in fixes based at least partly on terrestrial wireless communication measurements;
event position determination logic included in the module and operable to:
determine an estimated geographical position of the wireless device to associate with the event based on a predetermined relationship between the event and at least one of the first set of location fix information and the second set of location fix information, wherein the event corresponds to a predetermined operation of the wireless device;
determine the estimated geographical position based upon selecting one of the first location fix information and the second location fix information, wherein the predetermined relationship comprises one or more time relationships comprising a time difference between (a) an event time corresponding to the event and (b) a time corresponding to either one of the first location fix information and the second location fix information,
compare the one or more time relationships to one or more corresponding predetermined time thresholds; and
select the second location fix information as a basis for the estimated geographic position if, the first location fix information corresponds to a first fixed geographical position of the wireless device before a time corresponding to the event and a first time difference between (a) a time corresponding to the first location fix information, and (b) a time corresponding to the event is outside of the low time threshold, and the second location fix information corresponds to a second fixed geographic position of the wireless device after the time corresponding to the event and a second time difference between (a) the time corresponding to the first location fix information, and (b) a time corresponding to the event is within the predetermined time threshold.

38. The apparatus of claim 37, wherein at least one of the one of the first geographical position data and the second geographical position data correspond to an Advanced Forward Link Trilateration (AFLT) location fix.

39. The apparatus according to claim 37, wherein the event corresponds to a predetermined operation of the wireless device.

40. The apparatus according to claim 39, wherein the event corresponds to one or more predetermined configurable sequences of data associated with an operation of the wireless device.

41. The apparatus according to claim 37, wherein the predetermined time threshold comprises predetermined maximum time difference between (a) a time corresponding to either one of the first location fix information and the second location fix information, and (b) the event time.

42. The apparatus according to claim 37, wherein the low time threshold comprises a time taken by the wireless device to travel the predetermined distance threshold at a predetermined maximum speed.

43. The apparatus according to claim 37, wherein the event position logic is further operable to determining a preferred location fix information from among the first and second location fix information based on a comparison of the first time difference to the second time difference less a time bias, where the time bias is defined as an average difference between (a) a time corresponding to location fix information and (c) the time corresponding to a request for the location fix information.

44. The apparatus according to claim 43, wherein the event position logic is further operable to select the first location fix information as a basis for the estimated geographic position if the first time difference is less than the second time difference less the time bias.

45. The apparatus according to claim 43, wherein the event position logic is further operable to select the second location fix information as a basis for the estimated geographic position if the first time difference is greater than or equal to than or equal to the second time difference less the time bias.

46. The apparatus according to claim 37, wherein the event position determination module is further operable to:
receive, from a position determination entity, a third set of location fix information; and determine the estimated geographical position of the wireless device based on a predetermined relationship between the event and the third set of location fix information.

47. An apparatus for estimating a geographical position corresponding to a wireless device event, comprising:
an event position determination module operable to receive at least one of a first set of location fix information of the wireless device corresponding to a first location fix having a first Quality of Service (QoS) and a second set of location fix information of the wireless device corresponding to a second location fix having a second QoS, wherein the first and second QoS result in fixes based at least partly on terrestrial wireless communication measurements;
event position determination logic included in the module and operable to:
determine an estimated geographical position of the wireless device to associate with the event based on a predetermined relationship between the event and at least one of the first set of location fix information and the second set of location fix information, wherein the event corresponds to a predetermined operation of the wireless device;
determine the estimated geographical position based upon selecting one of the first location fix information and the second location fix information, wherein the predetermined relationship comprises one or more time relationships comprising a time difference between (a) an event time corresponding to the event and (b) a time corresponding to either one of the first location fix information and the second location fix information,
compare the one or more time relationships to one or more corresponding predetermined time thresholds; and
select one of the first location fix information and the second location fix information as the estimated geographical position if, the first location fix information corresponds to a first fixed geographical position of the wireless device before a time corresponding to the event and a first time difference between (a) a time corresponding to the first location fix information, and (b) a time corresponding to the event is within the low time threshold, and the second location fix information corresponds to a second fixed geographic position of the wireless device after the time corresponding to the event and a second time difference between (a) the time corresponding to the first location fix information, and (b) a time corresponding to the event is within the predetermined time threshold.

48. The apparatus according to claim 47, wherein the event position logic is further operable to determining a preferred location fix information from among the first and second location fix information based on a comparison of the first time difference to the second time difference less a time bias, where the time bias is defined as an average difference between (a) a time corresponding to location fix information and (c) the time corresponding to a request for the location fix information.

49. The apparatus according to claim 48, wherein the event position logic is further operable to select the first location fix information as a basis for the estimated geographic position if the first time difference is less than the second time difference less the time bias.

50. The apparatus according to claim 48, wherein the event position logic is further operable to select the second location fix information as a basis for the estimated geographic position if the first time difference is greater than or equal to than or equal to the second time difference less the time bias.

51. The apparatus of claim 42, wherein at least one of the one of the first geographical position data and the second geographical position data correspond to an Advanced Forward Link Trilateration (AFLT) location fix.

52. The apparatus according to claim 47, wherein the event corresponds to a predetermined operation of the wireless device.

53. The apparatus according to claim 52, wherein the event corresponds to one or more predetermined configurable sequences of data associated with an operation of the wireless device.

54. The apparatus according to claim 47, wherein the predetermined time threshold comprises predetermined maximum time difference between (a) a time corresponding to either one of the first location fix information and the second location fix information, and (b) the event time.

55. The apparatus according to claim 47, wherein the low time threshold comprises a time taken by the wireless device to travel the predetermined distance threshold at a predetermined maximum speed.

56. The apparatus according to claim 47, wherein the event position determination module is further operable to:
receive, from a position determination entity, a third set of location fix information; and
determine the estimated geographical position of the wireless device based on a predetermined relationship between the event and the third set of location fix information.

57. An apparatus for estimating a geographical position corresponding to a wireless device event, comprising:
means for receiving at least one of a first geographical position data of the wireless device corresponding to a first location fix having a first Quality of Service (QoS) and a second geographical position data of the wireless device corresponding to a second location fix having a second QoS, wherein the first and second QoS result in fixes based at least partly on terrestrial wireless communication measurements, wherein at least one of the first geographical position data and the second geographical position data are derived from a Mobile Station-Assisted (MS-Assisted) mode of location determination;
means for determining an estimated geographical position of the wireless device based on a predetermined relationship between the event and at least one of the first geographical position data and the second geographical position data, wherein determining an estimated geographical position of the wireless device based on a predetermined relationship comprises selecting the estimated geographical position of the wireless device from one of the first geographical position data of the wireless device and the second geographical position data of the wireless device, wherein the predetermined relationship comprises one or more time relationships comprising a time difference between (a) a time corresponding to the event and (b) a time corresponding to any one of: the first geographical position data and the second geographical position data;
means for comparing the one or more time relationships to one or more corresponding predetermined time thresholds, wherein the one or more predetermined time thresholds comprise a predetermined time threshold and a low time threshold; and
means for selecting the first geographic position data as a basis for the estimated geographic position if, the first geographical position data corresponds to a first fixed geographical position of the wireless device before a time corresponding to the event and the first time difference between (a) a time corresponding to the first geographical position data, and (b) a time corresponding to the event is within the low time threshold, and the second geographical position data corresponds to a second fixed geographic position of the wireless device after the time corresponding to the event and the second time difference between (a) the time corresponding to the first geographical position data, and (b) a time corresponding to the event is outside of the predetermined time threshold.

58. An apparatus for estimating a geographical position corresponding to a wireless device event, comprising:
means for receiving at least one of a first geographical position data of the wireless device corresponding to a first location fix having a first Quality of Service (QoS) and a second geographical position data of the wireless device corresponding to a second location fix having a second QoS, wherein the first and second QoS result in fixes based at least partly on terrestrial wireless communication measurements, wherein at least one of the first geographical position data and the second geographical position data are derived from a Mobile Station-Assisted (MS-Assisted) mode of location determination;
means for determining an estimated geographical position of the wireless device based on a predetermined relationship between the event and at least one of the first geographical position data and the second geographical position data, wherein determining an estimated geographical position of the wireless device based on a predetermined relationship comprises selecting the estimated geographical position of the wireless device from one of the first geographical position data of the wireless device and the second geographical position data of the wireless device, wherein the predetermined relationship comprises one or more time relationships comprising a time difference between (a) a time corresponding to the event and (b) a time corresponding to any one of: the first geographical position data and the second geographical position data;
means for comparing the one or more time relationships to one or more corresponding predetermined time thresholds, wherein the one or more predetermined time thresholds comprise a predetermined time threshold and a low time threshold; and
means for selecting the second geographic position data as a basis for the estimated geographic position if, the first geographical position data corresponds to a first fixed geographical position of the wireless device before a time corresponding to the event and the first time difference between (a) a time corresponding to the first geographical position data, and (b) a time corresponding to the event is outside of the low time threshold, and the second geographical position data corresponds to a second fixed geographic position of the wireless device after the time corresponding to the event and the second time difference between (a) the time corresponding to the first geographical position data, and (b) a time corresponding to the event is within the predetermined time threshold.

59. An apparatus for estimating a geographical position corresponding to a wireless device event, comprising:
means for receiving at least one of a first geographical position data of the wireless device corresponding to a first location fix having a first Quality of Service (QoS) and a second geographical position data of the wireless device corresponding to a second location fix having a second QoS, wherein the first and second QoS result in fixes based at least partly on terrestrial wireless communication measurements, wherein at least one of the first geographical position data and the second geographical position data are derived from a Mobile Station-Assisted (MS-Assisted) mode of location determination;
means for determining an estimated geographical position of the wireless device based on a predetermined relationship between the event and at least one of the first geographical position data and the second geographical position data, wherein determining an estimated geographical position of the wireless device based on a predetermined relationship comprises selecting the estimated geographical position of the wireless device from one of the first geographical position data of the wireless device and the second geographical position data of the wireless device, wherein the predetermined relationship comprises one or more time relationships comprising a time difference between (a) a time corresponding to the event and (b) a time corresponding to any one of: the first geographical position data and the second geographical position data;
means for comparing the one or more time relationships to one or more corresponding predetermined time thresholds, wherein the one or more predetermined time thresholds comprise a predetermined time threshold and a low time threshold; and
means for selecting one of the first geographical position data and the second geographical position data as a basis for the estimated geographical position if: the first geographical position data corresponds to a first fixed geographical position of the wireless device before a time corresponding to the event and the first time difference between (a) a time corresponding to the first geographical position data, and (b) a time corresponding to the event is within the low time threshold, and the second geographical position data corresponds to a second fixed geographic position of the wireless device after the time corresponding to the event and the second time difference between (a) a time corresponding to the first geographical position data, and (b) a time corresponding to the event is within the predetermined time threshold.

60. A computer program product for estimating a geographical position corresponding to a wireless device event, comprising:
a non-transitory computer read-readable medium, comprising:
code for causing at least one computer to receive at least one of a first geographical position data of the wireless device corresponding to a first location fix having a first Quality of Service (QoS) and a second geographical position data of the wireless device corresponding to a second location fix having a second QoS, wherein the first and second QoS result in fixes based at least partly on terrestrial wireless communication measurements, wherein at least one of the first geographical position data and the second geographical position data are derived from a Mobile Station-Assisted (MS-Assisted) mode of location determination;
code for causing at least one computer to determine an estimated geographical position of the wireless device based on a predetermined relationship between the event and at least one of the first geographical position data and the second geographical position data, wherein determining an estimated geographical position of the wireless device based on a predetermined relationship comprises selecting the estimated geographical position of the wireless device from one of the first geographical position data of the wireless device and the second geographical position data of the wireless device, wherein the predetermined relationship comprises one or more time relationships comprising a time difference between (a) a time corresponding to the event and (b) a time corresponding to any one of: the first geographical position data and the second geographical position data;

code for causing at least one computer to compare the one or more time relationships to one or more corresponding predetermined time thresholds, wherein the one or more predetermined time thresholds comprise a predetermined time threshold and a low time threshold; and code for causing at least one computer to select the first geographic position data as a basis for the estimated geographic position if, the first geographical position data corresponds to a first fixed geographical position of the wireless device before a time corresponding to the event and the first time difference between (a) a time corresponding to the first geographical position data, and (b) a time corresponding to the event is within the low time threshold, and the second geographical position data corresponds to a second fixed geographic position of the wireless device after the time corresponding to the event and the second time difference between (a) the time corresponding to the first geographical position data, and (b) a time corresponding to the event is outside of the predetermined time threshold.

61. A computer program product for estimating a geographical position corresponding to a wireless device event, comprising:

a non-transitory computer read-readable medium, comprising:

code for causing at least one computer to receive at least one of a first geographical position data of the wireless device corresponding to a first location fix having a first Quality of Service (QoS) and a second geographical position data of the wireless device corresponding to a second location fix having a second QoS, wherein the first and second QoS result in fixes based at least partly on terrestrial wireless communication measurements, wherein at least one of the first geographical position data and the second geographical position data are derived from a Mobile Station-Assisted (MS-Assisted) mode of location determination;

code for causing at least one computer to determine an estimated geographical position of the wireless device based on a predetermined relationship between the event and at least one of the first geographical position data and the second geographical position data, wherein determining an estimated geographical position of the wireless device based on a predetermined relationship comprises selecting the estimated geographical position of the wireless device from one of the first geographical position data of the wireless device and the second geographical position data of the wireless device, wherein the predetermined relationship comprises one or more time relationships comprising a time difference between (a) a time corresponding to the event and (b) a time corresponding to any one of: the first geographical position data and the second geographical position data;

code for causing at least one computer to compare the one or more time relationships to one or more corresponding predetermined time thresholds, wherein the one or more predetermined time thresholds comprise a predetermined time threshold and a low time threshold; and code for causing at least one computer to select the second geographic position data as a basis for the estimated geographic position if, the first geographical position data corresponds to a first fixed geographical position of the wireless device before a time corresponding to the event and the first time difference between (a) a time corresponding to the first geographical position data, and (b) a time corresponding to the event is outside of the low time threshold, and the second geographical position data corresponds to a second fixed geographic position of the wireless device after the time corresponding to the event and the second time difference between (a) the time corresponding to the first geographical position data, and (b) a time corresponding to the event is within the predetermined time threshold.

62. A computer program product for estimating a geographical position corresponding to a wireless device event, comprising:

a non-transitory computer read-readable medium, comprising:

code for causing at least one computer to receive at least one of a first geographical position data of the wireless device corresponding to a first location fix having a first Quality of Service (QoS) and a second geographical position data of the wireless device corresponding to a second location fix having a second QoS, wherein the first and second QoS result in fixes based at least partly on terrestrial wireless communication measurements, wherein at least one of the first geographical position data and the second geographical position data are derived from a Mobile Station-Assisted (MS-Assisted) mode of location determination;

code for causing at least one computer to determine an estimated geographical position of the wireless device based on a predetermined relationship between the event and at least one of the first geographical position data and the second geographical position data, wherein determining an estimated geographical position of the wireless device based on a predetermined relationship comprises selecting the estimated geographical position of the wireless device from one of the first geographical position data of the wireless device and the second geographical position data of the wireless device, wherein the predetermined relationship comprises one or more time relationships comprising a time difference between (a) a time corresponding to the event and (b) a time corresponding to any one of: the first geographical position data and the second geographical position data;

code for causing at least one computer to compare the one or more time relationships to one or more corresponding predetermined time thresholds, wherein the one or more predetermined time thresholds comprise a predetermined time threshold and a low time threshold; and code for causing at least one computer to select one of the first geographical position data and the second geographical position data as a basis for the estimated geographical position if: the first geographical position data corresponds to a first fixed geographical position of the wireless device before a time corresponding to the event and the first time difference between (a) a time corresponding to the first geographical position data, and (b) a time corresponding to the event is within the low time threshold, and the second geographical position data corresponds to a second fixed geographic position of the wireless device after the time corresponding to the event and the second time difference between (a) a time corresponding to the first geographical position data, and (b) a time corresponding to the event is within the predetermined time threshold.

\* \* \* \* \*